US012777433B2

(12) United States Patent
Berndsen et al.

(10) Patent No.: US 12,777,433 B2
(45) Date of Patent: Oct. 27, 2026

(54) ALLOCATING TRANSMISSION POWER TO CLIENT DEVICES IN A COMMUNICATIONS NETWORK

(71) Applicant: ViaSat, Inc., Carlsbad, CA (US)

(72) Inventors: Nicholas G. Berndsen, Parker, CO (US); Michail K. Tsatsanis, Huntington Beach, CA (US)

(73) Assignee: Viasat, Inc., Carlsbad, CA (US)

( * ) Notice: Subject to any disclaimer, the term of this patent is extended or adjusted under 35 U.S.C. 154(b) by 196 days.

(21) Appl. No.: 18/843,077

(22) PCT Filed: Mar. 4, 2022

(86) PCT No.: PCT/US2022/019032
§ 371 (c)(1),
(2) Date: Aug. 30, 2024

(87) PCT Pub. No.: WO2023/167686
PCT Pub. Date: Sep. 7, 2023

(65) Prior Publication Data
US 2025/0203537 A1 Jun. 19, 2025

(51) Int. Cl.
*H04W 52/42* (2009.01)
*H04B 7/06* (2006.01)
(Continued)

(52) U.S. Cl.
CPC .......... *H04W 52/42* (2013.01); *H04B 7/0617* (2013.01); *H04L 5/0023* (2013.01); *H04W 52/367* (2013.01)

(58) Field of Classification Search
CPC . H04W 52/42; H04W 52/367; H04W 52/262; H04B 7/0617; H04B 7/18543; H04L 5/0023
See application file for complete search history.

(56) References Cited

U.S. PATENT DOCUMENTS 8,380,133 B2 * 2/2013 Lakshmanan ........ H04B 7/0617 455/63.4
2020/0136720 A1 * 4/2020 Miller .................. H04B 7/2041
(Continued)

FOREIGN PATENT DOCUMENTS

CN 106658733 B 4/2020

OTHER PUBLICATIONS

"PCT Isr & Written Opinion", App No. PCT/US2022/019032, Oct. 17, 2022, 17 pages.
(Continued)

*Primary Examiner* — Curtis A Kuntz
(74) *Attorney, Agent, or Firm* — Murphy, Bilak & Homiller, PLLC

(57) ABSTRACT

Described herein are systems and methods for allocating transmission power in a communications network that are based in part on fairness considerations. The disclosed technologies factor the needs and requirements of individual client devices (e.g. subscribers or users) into the process for allocating transmission power using a satisfaction metric. The disclosed technologies do not necessarily optimize the throughput or output of the transmitter as in typical water-filling algorithms, but rather aim to satisfy the individual requirement of client devices. To do this, the disclosed technologies calculate a satisfaction metric that is based on quality-of-service (QOS) parameters of individual and client devices.

21 Claims, 11 Drawing Sheets

(51) Int. Cl.
*H04L 5/00* (2006.01)
*H04W 52/36* (2009.01)

(56) References Cited

U.S. PATENT DOCUMENTS

| | | | | |
|---|---|---|---|---|
| 2021/0050913 | A1* | 2/2021 | Peponides | B64G 1/1007 |
| 2025/0056541 | A1* | 2/2025 | Nuttall | H04W 72/044 |

OTHER PUBLICATIONS

Chien, Trinh Van, et al., "User Scheduling and Power Allocation for Precoded Multi-Beam High Throughput Satellite Systems with Individual Quality of Service Constraints", arXiv:2110.02525v1 [cs.IT], Oct. 6, 2021, 15 pages.

Ginting, Roy Cristianta, et al., "Waterfilling Power Control on Proportional Fair Algorithm to Maintain Fairness and Saves Power for MIMO-OFDMA 2x2", 4th International Conference on Science and Technology (ICST), Yogyakarta, Indonesia, 2018, 5 pages.

* cited by examiner

ALLOCATING TRANSMISSION POWER TO CLIENT DEVICES IN A COMMUNICATIONS NETWORK

BACKGROUND

Field

The present disclosure generally relates to the allocation of transmission power from a transmitter to a plurality of client devices in a communications network.

Description of Related Art

In a wireless communications network, a transmitter transmits information to a plurality of client devices. The transmission of information to the client devices can be broken up into frames where each frame is made up of a plurality of time slots and the transmitter can transmit information in each time slot using a plurality of frequency subcarriers. An individual transmitter has physical limitations to the amount of power it can output during any given time slot. Thus, there exist many ways to determine the allocation of transmission power for a time slot, including methods broadly categorized as waterfilling algorithms.

SUMMARY

According to a number of implementations, the present disclosure relates to a method for allocating transmission power from a transmitter to a plurality of client devices in a communications network. The method includes determining an expected throughput for each of the plurality of client devices, the expected throughput based at least in part on an allocation of transmission power to each client device. The method also includes for each client device of the plurality of client devices, calculating a satisfaction metric that is based at least in part on one or more quality of service parameters and the expected throughput for the client device. The method also includes iteratively allocating transmission power by: selecting a client device with a satisfaction metric that indicates that the client device is to receive a next allocation of transmission power; assigning the next allocation of transmission power to the selected client device resulting in an aggregated amount of transmission power for the selected client device; updating the expected throughput for the selected client device based at least in part on the aggregated amount of transmission power; and updating the satisfaction metric for the selected client device.

In some embodiments, the transmitter comprises a satellite. In some embodiments, the transmitter comprises a base station of a wireless network. In further embodiments, the wireless network comprises a cellular network.

In some embodiments, the assigning further comprises determining a marginal efficiency for the selected client device; and the selected client device is assigned the next allocation of transmission power responsive to determining that the marginal efficiency for the selected device is greater than a minimum marginal efficiency value. In further embodiments, iteratively allocating transmission power further comprises updating the marginal efficiency for the selected client device. In further embodiments, iteratively allocating transmission power further comprises increasing the minimum marginal efficiency value for the selected client device.

In some embodiments, the method further includes ordering the plurality of client devices based on the satisfaction metric of each client device, an order of the plurality of client devices corresponding to a priority for allocating transmission power such that a first client device in the order is configured to be assigned a next allocation of transmission power. In some embodiments, the satisfaction metric of an individual client device is assigned to be a value that indicates that the individual client device is not to receive further allocations of transmission power responsive to the expected throughput of the individual client device being greater than or equal to a maximum transmission rate assigned to the individual client device. In some embodiments, the one or more quality of service parameters includes a weight assigned to individual client devices of the plurality of client devices. In some embodiments, the one or more quality of service parameters includes a maximum transmission rate assigned to individual client devices of the plurality of client devices.

In some embodiments, the one or more quality of service parameters includes a minimum transmission rate assigned to individual client devices of the plurality of client devices. In further embodiments, the satisfaction metric of an individual client device is assigned to be the expected throughput divided by the minimum transmission rate responsive to the expected throughput being less than the minimum transmission rate. In yet further embodiments, the satisfaction ratio of an individual client device is assigned to be one plus a difference between the expected throughput and the minimum transmission rate responsive to the expected throughput being greater than or equal to the minimum transmission rate and less than a maximum transmission rate assigned to the individual client device.

In some embodiments, the one or more quality of service parameters includes a priority assigned to individual client devices of the plurality of client devices. In further embodiments, the satisfaction metric of an individual client device is assigned to be the priority plus a ratio of the expected throughput to a maximum transmission rate of the individual client device responsive to the expected throughput being less than the maximum transmission rate.

In some embodiments, the selected client device is the client device with the lowest satisfaction metric. In some embodiments, transmission from the transmitter to the plurality of client devices is divided into time slots and transmission power is allocated for each time slot. In further embodiments, each time slot includes a plurality of frequency subcarriers and transmission power is divided between individual frequency subcarriers of the plurality of frequency subcarriers.

According to a number of implementations, the present disclosure relates to a method for allocating transmission power from a transmitter to a plurality of client devices in a communications network, the transmitter configured to transmit information using frames that comprise a plurality of time slots and a plurality of frequency subcarriers. The method includes assigning a respective plurality of time frequency blocks to each client device of a plurality of client devices, each time frequency block comprising a time slot of the plurality of time slots and a frequency subcarrier of the plurality of frequency subcarriers. The method also includes determining a corresponding marginal efficiency for each time frequency block of the respective plurality of time frequency blocks assigned to each of the plurality of client devices. The method also includes determining an expected throughput for each of the plurality of client devices, the expected throughput based at least in part on an allocation of transmission power to an individual client device and a time frequency block quality for each of the respective plurality of time frequency blocks assigned to the individual client device. The method also includes for each client device of the plurality of client devices, calculating a satisfaction metric that is based at least in part on one or more quality of service parameters and the expected throughput for the client device. The method also includes iteratively allocating transmission power for a given time slot by: selecting a client device with a satisfaction metric that indicates that the client device is next to be assigned an allocation of transmission power; selecting a time frequency block that is assigned to the selected client device, the selected time frequency block having the highest marginal efficiency of the plurality of time frequency blocks assigned to the selected client device; assigning the next allocation of transmission power to the selected time frequency block of the selected client device resulting in an aggregated amount of transmission power for the selected time frequency block; updating the expected throughput for the selected client device based at least in part on the aggregated amount of transmission power for the selected time frequency block; updating the marginal efficiency for the selected time frequency block; and updating the satisfaction metric for the selected client device.

In some embodiments, the transmitter comprises a satellite. In further embodiments, the satellite is configured to form a plurality of beams. In further embodiments, each time frequency block further includes a spatial component associated with individual beams of the plurality of beams.

In some embodiments, the time frequency block quality is based at least in part on an allocation of transmission power assigned to the time frequency block and a signal to noise ratio of the time frequency block. In some embodiments, the method further includes initializing transmission power allocated to each time frequency block to an initial power value prior to iteratively allocating the transmission power.

In some embodiments, the method further includes determining an available amount of transmission power for the given time slot. In further embodiments, the method further includes reducing the available amount of transmission power for the given time slot based on the allocation of transmission power to the selected client device for the selected time frequency block.

In some embodiments, assigning the allocation of transmission power to the selected client device for the selected time frequency block is responsive to determining that the selected time slot has sufficient transmission power available for the allocation of transmission power. In some embodiments, the selected client device is assigned the next allocation of transmission power responsive to determining that the marginal efficiency for the selected device is greater than a minimum marginal efficiency value. In further embodiments, iteratively allocating transmission power further comprises increasing the minimum marginal efficiency value for the selected client device.

In some embodiments, the method further includes ordering the plurality of client devices based on the satisfaction metric of each client device, an order of the plurality of client devices corresponding to a priority for allocating transmission power such that a first client device in the order is the client device to be assigned the next allocation of transmission power. In some embodiments, the satisfaction metric of an individual client device is assigned to be a value that indicates that the individual client device is not to receive further allocations of transmission power responsive to the expected throughput of the individual client device being greater than or equal to a maximum transmission rate assigned to the individual client device. In some embodiments, the one or more quality of service parameters includes a weight assigned to individual client devices of the plurality of client devices. In some embodiments, the one or more quality of service parameters includes a maximum transmission rate assigned to individual client devices of the plurality of client devices.

In some embodiments, the one or more quality of service parameters includes a minimum transmission rate assigned to individual client devices of the plurality of client devices. In further embodiments, the satisfaction metric of an individual client device is assigned to be the expected throughput divided by the minimum transmission rate responsive to the expected throughput being less than the minimum transmission rate. In yet further embodiments, the satisfaction ratio of an individual client device is assigned to be one plus a difference between the expected throughput and the minimum transmission rate responsive to the expected throughput being greater than or equal to the minimum transmission rate and less than a maximum transmission rate assigned to the individual client device.

In some embodiments, the one or more quality of service parameters includes a priority assigned to individual client devices of the plurality of client devices. In further embodiments, the satisfaction metric of an individual client device is assigned to be the priority plus a ratio of the expected throughput to a maximum transmission rate of the individual client device responsive to the expected throughput being less than the maximum transmission rate. In some embodiments, the selected client device is the client device with the lowest satisfaction metric.

According to a number of implementations, the present disclosure relates to a power allocation system for a communications network. The power allocation system includes a transmitter configured to transmit information to a plurality of client devices through a plurality of client satellite transceivers, the transmitter configured to transmit information using frames that are each divided into a plurality of time slots with each time slot including a plurality of frequency subcarriers. The power allocation system also includes a non-transitory computer-readable medium storing processor-executable instructions. The power allocation system also includes a processor communicatively coupled to the transmitter and the non-transitory computer-readable medium. The processor-executable instructions are configured to cause the processor to determine an expected throughput for each of the plurality of client devices, the expected throughput based at least in part on an allocation of transmission power to each client device; for each client device of the plurality of client devices, calculate a satisfaction metric that is based at least in part on one or more quality of service parameters and the expected throughput for the client device; and iteratively allocate transmission power of the transmitter by: selecting a client device with a satisfaction metric that indicates that the client device is to receive a next allocation of transmission power; assigning the next allocation of transmission power to the selected client device resulting in an aggregated amount of transmission power for the selected client device; updating the expected throughput for the selected client device based at least in part on the aggregated amount of transmission power; and updating the satisfaction metric for the selected client device.

In some embodiments, the transmitter comprises a satellite. In some embodiments, the transmitter comprises a base station of a wireless network. In further embodiments, the wireless network comprises a cellular network.

In some embodiments, the assigning further comprises determining a marginal efficiency for the selected client device; and the selected client device is assigned the next allocation of transmission power responsive to the processor determining that the marginal efficiency for the selected device is greater than a minimum marginal efficiency value. In further embodiments, the processor is further configured to update the marginal efficiency for the selected client device as part of iteratively allocating transmission power. In further embodiments, the processor is further configured to increase the minimum marginal efficiency value for the selected client device as part of iteratively allocating transmission power.

In some embodiments, the processor is further configured to order the plurality of client devices based on the satisfaction metric of each client device, an order of the plurality of client devices corresponding to a priority for allocating transmission power such that a first client device in the order is configured to be assigned a next allocation of transmission power. In some embodiments, the processor is further configured to assign the satisfaction metric of an individual client device to be a value that indicates that the individual client device is not to receive further allocations of transmission power responsive to the expected throughput of the individual client device being greater than or equal to a maximum transmission rate assigned to the individual client device. In some embodiments, the one or more quality of service parameters includes a weight assigned to individual client devices of the plurality of client devices. In some embodiments, the one or more quality of service parameters includes a maximum transmission rate assigned to individual client devices of the plurality of client devices.

In some embodiments, the one or more quality of service parameters includes a minimum transmission rate assigned to individual client devices of the plurality of client devices. In further embodiments, the processor is further configured to assign the satisfaction metric of an individual client device to be the expected throughput divided by the minimum transmission rate responsive to the expected throughput being less than the minimum transmission rate. In yet further embodiments, the processor is further configured to assign the satisfaction ratio of an individual client device to be one plus a difference between the expected throughput and the minimum transmission rate responsive to the expected throughput being greater than or equal to the minimum transmission rate and less than a maximum transmission rate assigned to the individual client device.

In some embodiments, the one or more quality of service parameters includes a priority assigned to individual client devices of the plurality of client devices. In some embodiments, the processor is further configured to assign the satisfaction metric of an individual client device to be the priority plus a ratio of the expected throughput to a maximum transmission rate of the individual client device responsive to the expected throughput being less than the maximum transmission rate. In some embodiments, the selected client device is the client device with the lowest satisfaction metric.

In some embodiments, the transmitter is configured to form a plurality of beams. In further embodiments, two or more of the plurality of beams overlap such that the beams may interfere with one another. In further embodiments, a first client device covered by a first beam of the plurality of beams receives transmissions during a first time slot and a second client device covered by a second beam that overlaps with the first beam receives transmissions during a second time slot different from the first time slot.

According to a number of implementations, the present disclosure relates to a power allocation system for a communications network. The power allocation system includes a transmitter configured to transmit information to a plurality of client devices through a plurality of client satellite transceivers, the transmitter configured to transmit information using frames that are each divided into a plurality of time slots with each time slot including a plurality of frequency subcarriers. The power allocation system also includes a non-transitory computer-readable medium storing processor-executable instructions. The power allocation system also includes a processor communicatively coupled to the transmitter and the non-transitory computer-readable medium. The processor-executable instructions are configured to cause the processor to: assign a respective plurality of time frequency blocks to each client device of a plurality of client devices, each time frequency block comprising a time slot of the plurality of time slots and a frequency subcarrier of the plurality of frequency subcarriers; determine a corresponding marginal efficiency for each time frequency block of the respective plurality of time frequency blocks assigned to each of the plurality of client devices; determine an expected throughput for each of the plurality of client devices, the expected throughput based at least in part on an allocation of transmission power to an individual client device and a time frequency block quality for each of the respective plurality of time frequency blocks assigned to the individual client device; for each client device of the plurality of client devices, calculate a satisfaction metric that is based at least in part on one or more quality of service parameters and the expected throughput for the client device; and iteratively allocate transmission power for a given time slot by: selecting a client device with a satisfaction metric that indicates that the client device is next to be assigned an allocation of transmission power; selecting a time frequency block that is assigned to the selected client device, the selected time frequency block having the highest marginal efficiency of the plurality of time frequency blocks assigned to the selected client device; assigning the next allocation of transmission power to the selected time frequency block of the selected client device resulting in an aggregated amount of transmission power for the selected time frequency block; updating the expected throughput for the selected client device based at least in part on the aggregated amount of transmission power for the selected time frequency block; updating the marginal efficiency for the selected time frequency block; and updating the satisfaction metric for the selected client device.

In some embodiments, wherein the transmitter comprises a satellite. In further embodiments, the satellite is configured to form a plurality of beams. In yet further embodiments, each time frequency block further includes a spatial component associated with individual beams of the plurality of beams.

In some embodiments, the time frequency block quality is based at least in part on an allocation of transmission power assigned to the time frequency block and a signal to noise ratio of the time frequency block. In some embodiments, the processor is further configured to initialize transmission power allocated to each time frequency block to an initial power value prior to iteratively allocating the transmission power.

In some embodiments, the processor is further configured to determine an available amount of transmission power for the given time slot. In further embodiments, the processor is further configured to reduce the available amount of transmission power for the given time slot based on the allocation of transmission power to the selected client device for the selected time frequency block.

In some embodiments, the processor is configured to assign the allocation of transmission power to the selected client device for the selected time frequency block responsive to determining that the selected time slot has sufficient transmission power available for the allocation of transmission power. In some embodiments, the processor is configured to assign the selected client device the next allocation of transmission power responsive to determining that the marginal efficiency for the selected device is greater than a minimum marginal efficiency value. In further embodiments, the processor is further configured to increase the minimum marginal efficiency value for the selected client device as part of iteratively allocating transmission power.

In some embodiments, the processor is further configured to order the plurality of client devices based on the satisfaction metric of each client device, an order of the plurality of client devices corresponding to a priority for allocating transmission power such that a first client device in the order is the client device to be assigned the next allocation of transmission power. In some embodiments, the processor is further configured to assign the satisfaction metric of an individual client device to be a value that indicates that the individual client device is not to receive further allocations of transmission power responsive to the expected throughput of the individual client device being greater than or equal to a maximum transmission rate assigned to the individual client device. In some embodiments, the one or more quality of service parameters includes a weight assigned to individual client devices of the plurality of client devices. In some embodiments, the one or more quality of service parameters includes a maximum transmission rate assigned to individual client devices of the plurality of client devices.

In some embodiments, the one or more quality of service parameters includes a minimum transmission rate assigned to individual client devices of the plurality of client devices. In further embodiments, the processor is further configured to assign the satisfaction metric of an individual client device to be the expected throughput divided by the minimum transmission rate responsive to the expected throughput being less than the minimum transmission rate. In yet further embodiments, the processor is further configured to assign the satisfaction ratio of an individual client device to be one plus a difference between the expected throughput and the minimum transmission rate responsive to the expected throughput being greater than or equal to the minimum transmission rate and less than a maximum transmission rate assigned to the individual client device.

In some embodiments, the one or more quality of service parameters includes a priority assigned to individual client devices of the plurality of client devices. In further embodiments, the processor is further configured to assign the satisfaction metric of an individual client device to be the priority plus a ratio of the expected throughput to a maximum transmission rate of the individual client device responsive to the expected throughput being less than the maximum transmission rate. In some embodiments, the selected client device is the client device with the lowest satisfaction metric.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1A:
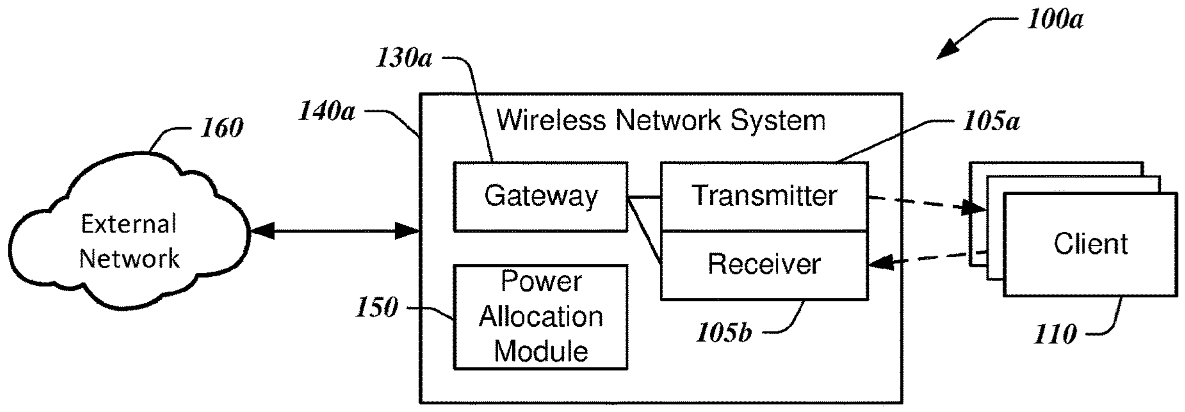
FIGS. 1A and 1B illustrate example communications networks.

The headings provided herein, if any, are for convenience only and do not necessarily affect the scope or meaning of the claimed invention.

Overview

Transmitting data to client devices in a wireless communications network involves dividing transmission resources into time frequency blocks where a time frequency block corresponds to one or more time slots and one or more frequency subcarriers in a frame. Some wireless communications networks use multi-frequency time-division multiple access (MF-TDMA) with spatial re-use technologies. These technologies dynamically share bandwidth among the client devices. Other technologies achieve the same or similar results by transmitting the information using multiple orthogonal subcarriers (e.g., Orthogonal Frequency Division Multiplexing or OFDM). These wireless communications networks may also create beams that serve certain geographical regions and/or certain groups of client devices. The transmitters in these wireless communications networks include amplifying components that are subject to physical power constraints. The power constraints limit the amount of power that can be utilized for transmitting information in a given time slot, the power being divided among the frequency subcarriers in the time slot (regardless of which of one or more beams is being used in networks that utilize beamforming technologies, for example). Thus, it would be desirable to allocate transmission power among the various time frequency blocks to improve or optimize efficiency, data throughput, client device requirements, and/or user satisfaction.

There exist many ways to determine the allocation of transmission power for a given time slot, including methods broadly categorized as waterfilling algorithms. These algorithms typically allocate transmission power in small increments, wherein each allocation of transmission power is assigned to the time frequency block (and client device) that would provide the most efficient use of that transmission power. This allocation of transmission power in small increments may be done within a computation loop that applies the transmit power after the computation loop has terminated, for example. In such algorithms, there is a problem of diminishing returns because there is a logarithmic relationship between throughput and transmission power. In addition, such algorithms may allocate large amounts of capacity to client devices that may not require it and leave other client devices with too little capacity.

Accordingly, to address these and other issues, described herein are systems and methods for allocating transmission power that are based at least in part on fairness considerations or satisfaction metrics for individual client devices. The disclosed systems and methods are similar to previous waterfilling techniques in that they may still consider factors such as marginal efficiency and total capacity, however the disclosed technologies also factor the needs and requirements of individual client devices (e.g., subscribers or users) into the process for allocating transmission power. The disclosed technologies do not necessarily optimize the throughput or output of the transmitter (such as a satellite) as in typical waterfilling algorithms, but rather aim to satisfy the individual requirements of client devices. To do this, the disclosed technologies calculate a satisfaction metric that is based on quality-of-service (QOS) parameters of individual client devices. Examples of these QoS parameters include, but are not limited to, maximum transmission rate, minimum transmission rate, proportionality weight, and priority.

FIG. 1A illustrates an example communications network 100*a* that can be configured to implement the disclosed transmission power allocation technologies. The communications network 100*a* can be a satellite network a cellular network, a wireless network implementing wireless broadband communication standards (e.g., Wi-Fi), and the like.

The communications network 100*a* implements a wireless network system 140*a* to communicatively couple clients 110 to an external network 160. The wireless network system 140*a* includes a transmitter 105*a* for transmitting wireless signals to the clients 110. The wireless network system 140*a* includes a receiver 105*b* for receiving signals from the clients 110. The transmitter 105*a* and the receiver 105*b* can include various components required for wireless communication including antennas, amplifiers, control circuitry, and the like.

The wireless network system 140*a* includes a gateway 130*a* for interfacing between the external network 160 and the wireless network system 140*a*. The gateway 130*a* can be configured to receive information destined for the client devices 110 from the external network 160 and to arrange for the information to be transmitted to the clients 110. Similarly, the gateway 130*a* can be configured to receive information from the client devices 110 and destined for a site on the external network 160 and to arrange for the information to be transmitted to the targeted site. In some embodiments, the wireless network system 140*a* also includes client gateways that interface between the clients 110 and the wireless network system 140*a*.

The wireless network system 140*a* implements a power allocation module 150 that communicates with the gateway 130*a*, the transmitter 105*a*, and the receiver 105*b*. The power allocation module 150 includes computing components such as processors and non-transitory memory to implement the power allocation technologies described herein. The power allocation module 150 is configured to allocate transmission power among the clients 110. In some embodiments, data transmission is divided into frames which last a certain duration. These frames are further divided into time slots. In addition, the wireless network system 140*a* can be configured to communicate over a range of frequencies. These frequencies can be divided into frequency subcarriers wherein a client device is configured to utilize one or more of these frequency subcarriers. As a result, transmission in a given time slot can be divided among a plurality of different frequency subcarriers to enable communication with a plurality of the clients 110 in each time slot.

The power allocation module 150 determines an amount of power to allocate in each time slot based at least in part on fairness considerations represented by a satisfaction metric, as described herein. These fairness considerations take into account client requirements and capabilities, which may be represented by various QoS parameters. These QoS parameters include, but are not limited to, the maximum transmission rate of a client device, the minimum transmission rate of a client device, a weight assigned to a client device, a priority assigned to a client device, and the like. The maximum transmission rate of a client device may be a value assigned to a client device rather than a physical limitation of the client device. This can be based on a subscriber agreement, for example, that caps the amount of bandwidth available to a subscriber. Similarly, the minimum transmission rate of a client device may be a value assigned to a client device. This can be based on a subscriber agreement, for example, that guarantees a minimum amount of bandwidth to a subscriber.

Figure 1B:
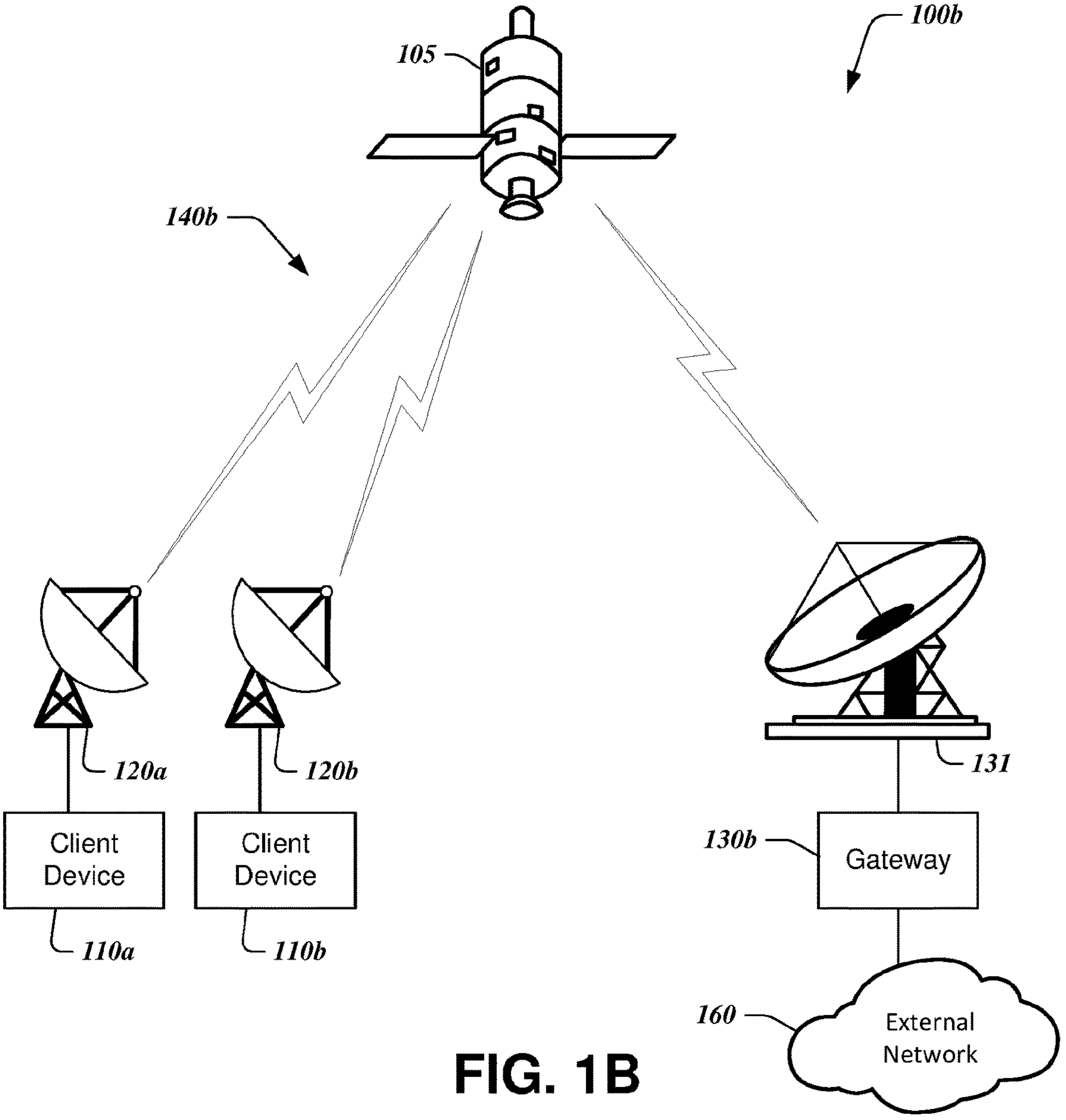

FIG. 1B illustrates an example communications network 100*b* that utilizes a satellite 105 as part of a wireless network 140*b*. The communications network 100*b* is also configured to use the power allocation technologies that are based at least in part on a satisfaction metric of individual clients, as described herein. The satellite 105 includes both a transmitter and receiver, as in the communications network 100*a* of FIG. 1A. In addition, although not shown, the communications network 100*b* includes a power allocation system similar to the power allocation module 150 of FIG. 1A. The power allocation system of the communications network 100*b* can be part of the satellite 105, a gateway 130*b*, a satellite transceiver 131, a customer client transceiver 120*a*, 120*b*, or it can distributed among these and other various components of the communications network 100*b*.

The satellite communications network 100*b* includes a satellite network 140*b* that communicatively couples a plurality of client devices 110*a*, 110*b* and a gateway routing device 130*b* to one another and to an external network 160 (such as the Internet). The satellite communications network 100*b* implements a power allocation module configured to allocate the transmission power of the satellite 105. The satellite communications network 100*b* includes a satellite transceiver 131 configured to transmit and to receive signals through the satellite 105.

The satellite communications network 100*b* may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. The satellite network 140*b* can include a geosynchronous earth orbit (GEO) satellite or satellites, a medium earth orbit (MEO) satellite or satellites, and/or a low earth orbit (LEO) satellite or satellites.

The client devices 110*a*, 110*b* can include a router and can be configured to receive data to be routed over the satellite communications network 100*b*, including any type of consumer premises equipment (e.g., a telephone, modem, router, computer, set-top box, and the like).

The client devices 110*a*, 110*b* are configured to route data to the satellite network 140*b* (via respective customer satellite transceivers 120*a*, 120*b*). The satellite network 140*b* includes a forward link for sending information from the gateway routing device 130*b* to the client devices 110*a*, 110*b*, and a return link for sending information from the client devices 110*a*, 110*b* to the gateway routing device 130*b*. The forward link includes a transmission path from the gateway routing device 130*b* through a gateway satellite transceiver 131, through a satellite 105 via a satellite uplink channel, to the customer satellite transceivers 120*a*, 120*b* via a satellite downlink channel, and to the client devices 110*a*, 110*b*. The return link includes a transmission path from the customer satellite transceivers 120*a*, 120*b*, to the satellite 105 via the satellite uplink channel, to the gateway satellite transceiver 131 via the satellite downlink channel, and to the gateway routing device 130*b*. Each transmission channel may utilize multiple satellites and transceivers.

Figure 2:
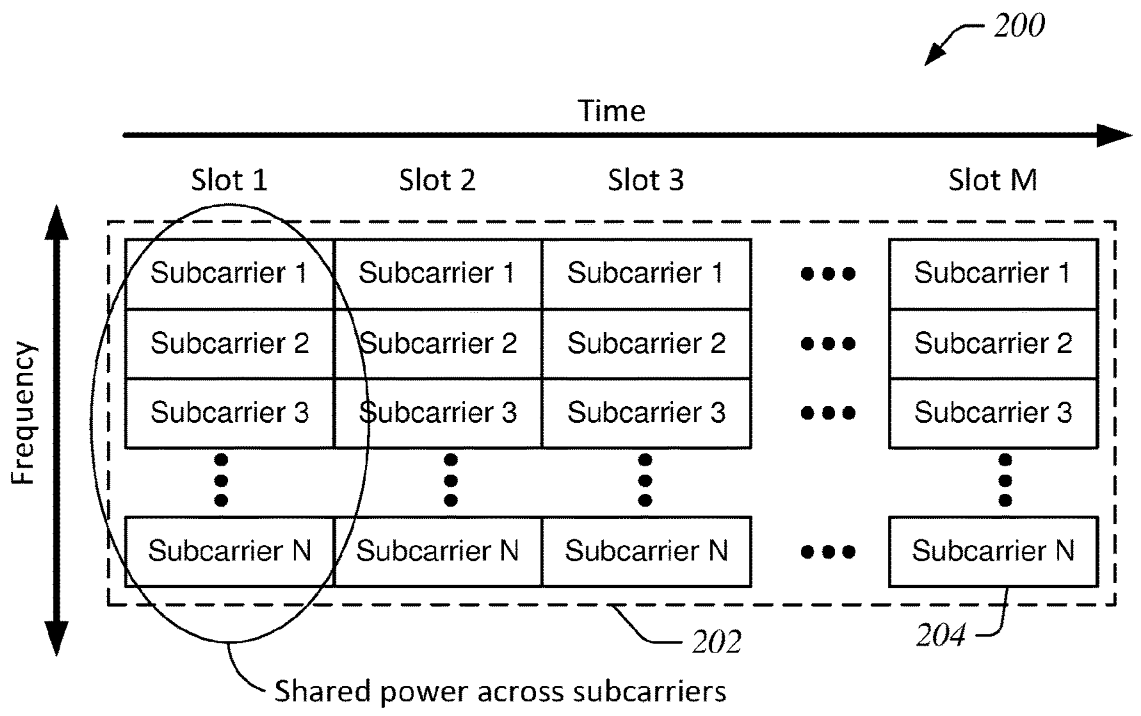
FIG. 2 illustrates an example of a division of transmission resources into time slots and frequency subcarriers.

FIG. 2 illustrates an example of a division of transmission resources 200 into time slots and frequency subcarriers. Transmission resources can be grouped into a frame 202, the frame being further divided into time slots and frequency subcarriers. A time frequency block 204 can be an individual unit of the frame 202, the time frequency block 204 being a particular frequency subcarrier in a particular time slot. As described herein, transmission power can be allocated for a frame using these time frequency blocks that comprise a time slot and a frequency subcarrier. It should be noted that the time slots need not be identical to one another with regard to which subcarriers are utilized or available in a particular time slot.

Transmission resources can be distributed (dynamically or statically) among the various client devices. For example, a client device can utilize a particular frequency subcarrier or a plurality of frequency subcarriers so that transmission resources to that client device are assigned or distributed using the particular frequency subcarrier or the particular plurality of frequency subcarriers. In addition, time slots in a frame can be assigned (dynamically or statically) to the various client devices. For example, a particular client device can be assigned one or more time slots in a frame. This can be done, for example, to reduce or eliminate interference between client devices that utilize the same frequency subcarriers. The time frequency blocks assigned to a client device can be static such that for particular frames, the time frequency blocks are the same for the client device. The time frequency blocks assigned to a client device can be dynamic such that for particular frames, the time frequency blocks assigned to the client device may change. In some embodiments, certain time frequency blocks may be unused.

Transmission power is shared among frequency subcarriers in a time slot. Because there are power constraints on the amplifier and transmitter (e.g., a satellite), transmission power is allocated among the frequency subcarriers for a given time slot with a cap on the total amount of transmission power available for use. Typically, each time slot has the same or similar power constraint. In some embodiments, individual time slots can have independent power constraints.

Examples of Transmission Power Allocation Technologies

A typical waterfilling algorithm is described here so that the improved transmission allocation technologies described herein may be more easily described. In typical waterfilling algorithms, transmission power is allocated across frequency subchannels to maximize total capacity (e.g., throughput). The allocation of transmission power is limited by the total power constraint for each time slot, as described herein. Transmission power is allocated in small increments, each time choosing a time frequency block that provides the most benefit (e.g., the largest increase in capacity). The marginal benefit (or marginal efficiency or marginal capacity) quantifies the increase in the benefit (e.g., the total capacity) as a result of the increase in allocated transmission power. Not all time frequency blocks have the same marginal benefit even when no power has been allocated. For example, time frequency blocks with high signal-to-noise ratios (SNRs) typically have a higher marginal benefit. In addition, the changes in marginal benefit are not all equal in size even if the amount of allocated power is the same. Again, this is affected by the properties of the time frequency block and the client device. This process is also generally subject to diminishing returns meaning that the more power a time frequency block already has, the smaller the marginal benefit. If power is allocated to the time frequency block with the largest marginal benefit (or smallest negative marginal benefit, as is typically illustrated), the marginal benefit will eventually equalize across all time frequency blocks. In such an algorithm, this represents an optimal solution.

To improve the process of allocating transmission power, the disclosed transmission power allocation technologies utilize a satisfaction metric in addition to considering the marginal benefit. The satisfaction metric quantifies fairness considerations. The result is that rather than optimizing on the marginal benefit, as is the case in typical waterfilling algorithms, the disclosed power allocation technologies improve or optimize on fairness to clients or subscribers.

Figure 3:
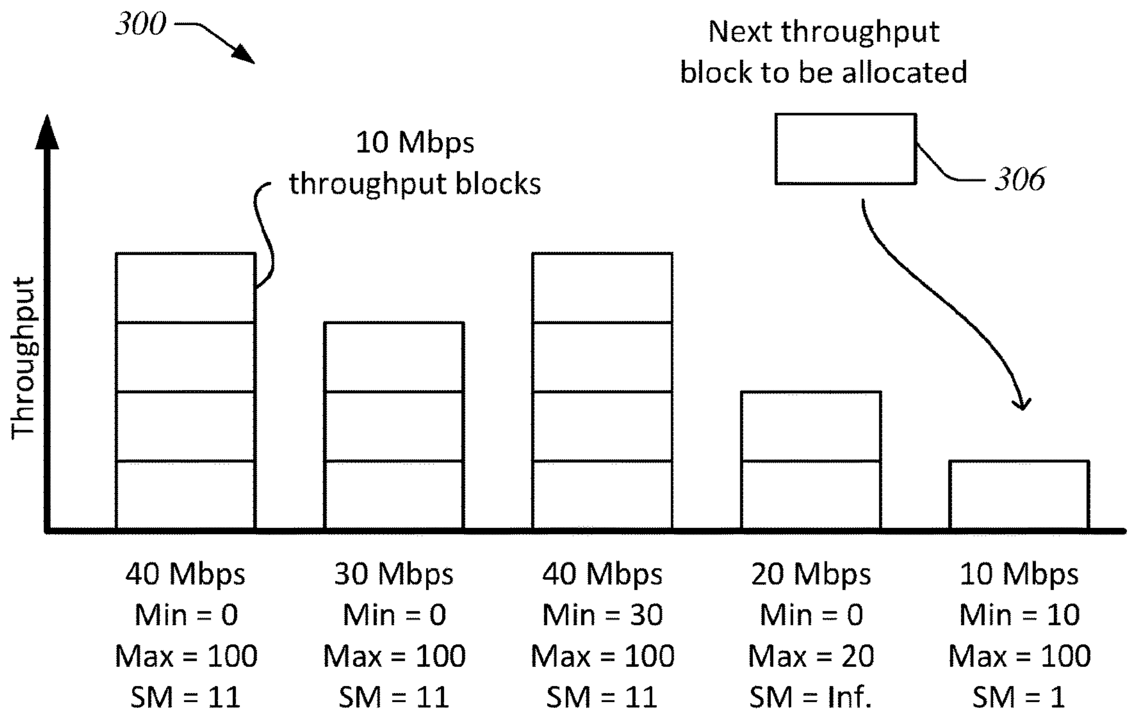
FIG. 3 illustrates the allocation of transmission resources to a plurality of users based on a satisfaction metric.

FIG. 3 illustrates the allocation of transmission resources to a plurality of users based at least in part on a satisfaction metric (SM). In the figure, throughput blocks are used to demonstrate the allocation of transmission power. It is to be understood that this is merely illustrative and that the allocation of transmission power need not be designed to achieve equal amounts of throughput for each allocation. For example, where the allocation of transmission power is based on equal blocks of transmission power, the resulting throughput may vary based on the time frequency block to which it is assigned.

The graph 300 demonstrates transmission power allocations to five different client devices with throughput indicated along a vertical axis. The next throughput block to be allocated, block 306, is shown as being allocated to the fifth client device wherein the decision to allocate block 306 to this client device is based on the fifth client device having the lowest satisfaction metric, or the satisfaction metric indicating that the fifth user is the least satisfied of all the client devices. Thus, the satisfaction metric is configured to be an indicator of fairness and can be used to identify to which client device the next allocation of transmission power should be assigned. As can be seen in the graph 300, a fair distribution of transmission power does not necessarily result in equal throughput being achieved for the client devices. In the example of FIG. 3, the first three client devices have equal satisfaction metrics but different throughputs.

As described herein, the satisfaction metric is based at least in part on one or more quality-of-service (QOS) parameters associated with a client device. The QoS parameters may be assigned to the client device based on an agreement with the entity providing the client device connectivity to an external network. Examples of QoS parameters include maximum transmission rate, minimum transmission rate, proportionality weight, priority (order), etc. The maximum transmission rate, which may also be referred to as permitted capacity, may correspond to a cap on the throughput for the client device. The minimum transmission rate, which may also be referred to as committed capacity, may correspond to a minimum rate committed to the client device or a minimum throughput a service provider is committed to provide to the client device. The weight or proportionality weight is used as a proportionality factor to scale throughput or transmission power in the case where client devices have not yet achieved their permitted capacities or maximum transmission rates.

The following provides a particular, non-limiting example of calculating a satisfaction metric for a particular client device. If the throughput of the client device is less than a minimum transmission rate, then the satisfaction metric can be assigned to be the current throughput divided by the minimum transmission rate. If the throughput of the client device is greater than the minimum transmission rate and less than a maximum transmission rate, then the satisfaction metric can be assigned to be one plus the difference between the throughput and the minimum transmission rate. In some embodiments, the difference between the throughput and the minimum transmission rate can be divided by a weight assigned to the client device. If the throughput of the client device is greater than or equal to the maximum transmission rate, the satisfaction metric can be assigned a value indicating that the client device is satisfied (e.g., infinity).

In the example of FIG. 3, the first, second, and third client devices have a satisfaction metric of 11, the fourth client device has an infinite satisfaction metric (indicating that it is satisfied), and the fifth client device has a satisfaction metric of 1. Because the fifth client device has the lowest satisfaction metric, it is the least satisfied and is slated to receive the next allocation of transmission power. After the allocation of throughput to the fifth client device, the satisfaction metric of the fifth client device becomes 11, equal to the first three client devices.

The allocation of transmission power described herein can also be extended to include priorities associated with client devices. Priorities can be used to override or modify the satisfaction metric. For example, a higher-priority client device receives allocations of transmission power until the minimum transmission rate of the client device is met prior to any lower-priority client devices receiving any allocations of transmission power. Then, once all client devices achieve 100% of their minimum transmission rates, the higher-priority client device receives allocations of transmission power until the maximum transmission rate of the client device is met. Once the maximum transmission rate of the client device is met, lower-priority client devices can be allocated transmission power.

As another example of a satisfaction metric, each client device is assigned a priority (PRI) and a permitted capacity (PC) or a maximum transmission rate. A client device with a higher importance (e.g., higher ranked priority) receives allocations of transmission power until the client device is fully satisfied (e.g., the current throughput is greater than or equal to the permitted capacity). In this example, priorities are defined such that 0 is the most important priority, and higher values indicate to lesser importance.

If the current throughput of the client device is greater than or equal to the PC, then the satisfaction metric is assigned to be infinite (or a value indicating it is satisfied). If the current throughput of the client device is less than the PC, then the satisfaction metric is assigned to be the priority plus the throughput divided by the PC. For example, client device A has a priority of 1, a PC of 50, and a current throughput of 50. The satisfaction metric for client device A is assigned to be infinite. Client device B has a priority of 2, a PC of 100, and a current throughput of 50. The satisfaction metric for client device B is: 2+50/100=2.5. Client device C has a priority of 2, a PC of 50, and a current throughput of 25. The satisfaction metric for client device C is: 2+25/50=2.5. Client device D has a priority of 3, a PC of 100, and a current throughput of 0. The satisfaction metric for client device D is: 3+0/100=3.

In this example, client device A has the highest importance (lowest value of priority) and has achieved its permitted capacity (PC), so the satisfaction metric is set to be infinity indicating that client device A will not receive more bandwidth. Client devices B and C have the lowest satisfaction metric, which are identical, so either client device can get the next allocation of transmission power (or bandwidth increment). Client device D has a less-important priority than client devices B and C, so its satisfaction metric is higher. This means that client device D will not be allocated transmission power until both client devices B and C reach their permitted capacities.

Accordingly, the disclosed transmission power allocation technologies focus on fairness considerations as quantified by the satisfaction metric. This is in contrast to typical waterfilling algorithms that focus on total capacity or throughput. By allocating transmission power based on the satisfaction metric, the system remains fair regardless of the quality of a client device's time frequency block or system (e.g., SNR). It should be noted the disclosed methods for determining a satisfaction metric are not exhaustive but are merely illustrative and that other methods for determining the satisfaction metric may be employed. For example, ranked priorities may be used, weight-based priorities may be used, other factors may be used in calculating the satisfaction metric (e.g., SNR, marginal efficiency, expected throughput, etc.), and the like. Focusing on fairness may result in different throughputs for different client devices because the client device with the satisfaction metric that indicates it is the least satisfied (e.g., the lowest satisfaction metric) is configured to receive the next allocation of transmission power. This may even occur where the client device already has a higher throughput than other client devices and where the marginal benefit is lower than for other client devices.

Transmission Power Allocation in Beamforming Systems

Figure 4:
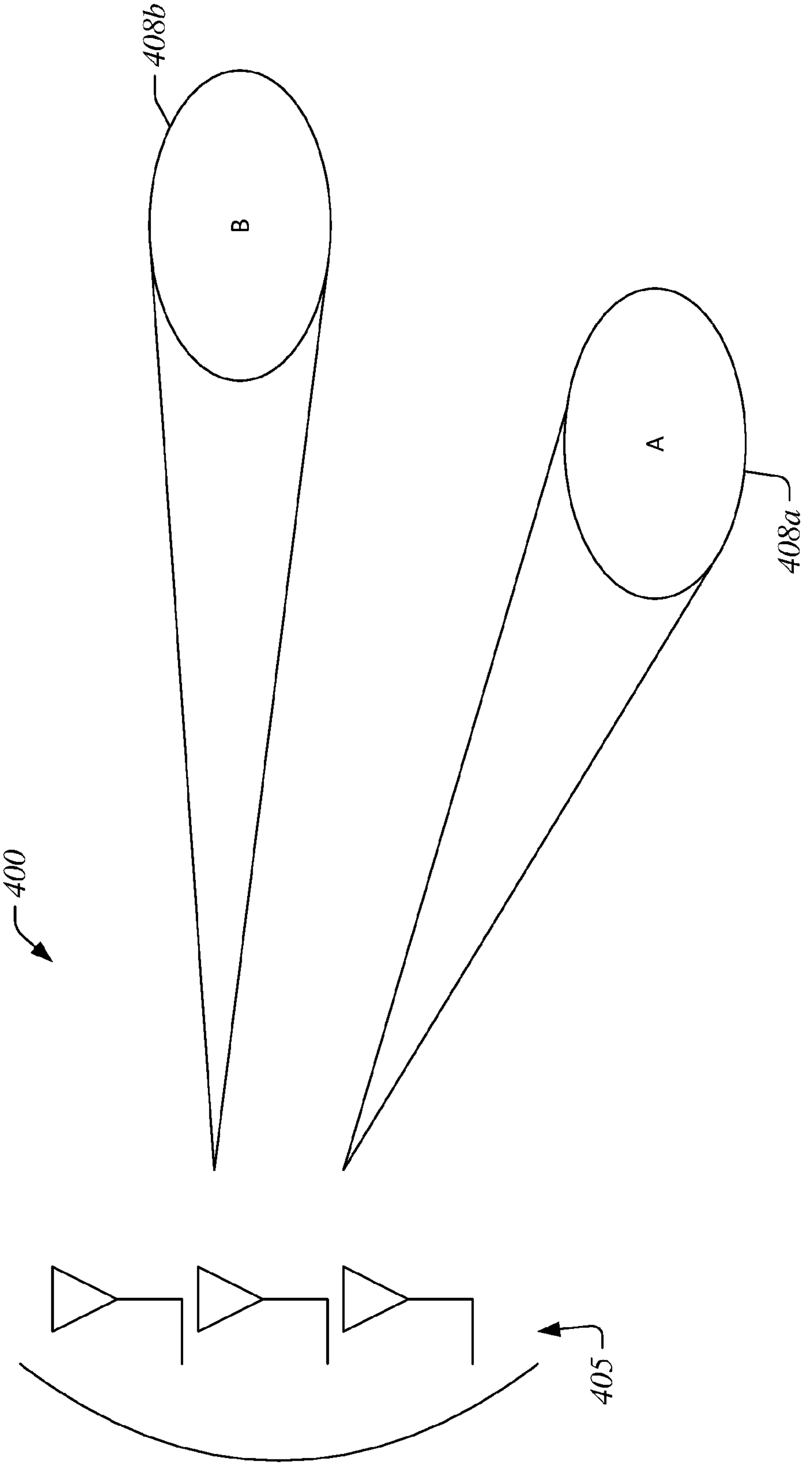
FIG. 4 illustrates a communications network where there is spatial reuse of time and frequency resources and a shared power constraint, such as typically implemented in multi-user multiple input, multiple output (MIMO) systems
Figure 5:
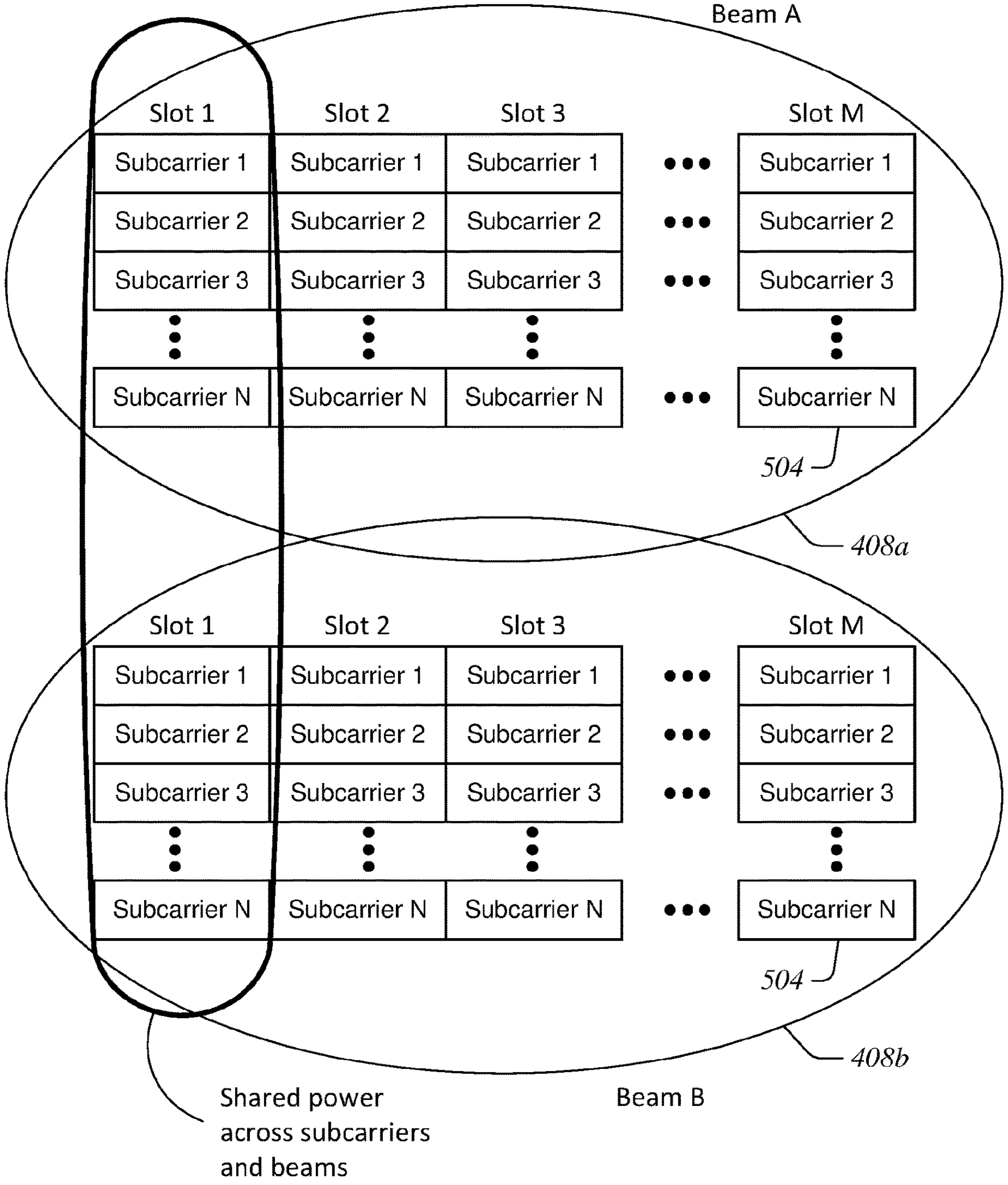
FIG. 5 illustrates an example of a division of transmission resources into time slots and frequency subcarriers in a communications network that provides a plurality of beams, such as the communications network of FIG. 4.

FIG. 4 illustrates a communications network 400 where there is spatial reuse of time and frequency resources and a shared power constraint, such as typically implemented in multi-user multiple input, multiple output (MIMO) systems. The communications network 400 includes a plurality of antennas 405 that are configured to provide beam A 408*a* and beam B 408*b*. Each beam 408*a*, 408*b* represents a geographical region covered by the antennas 405. Each beam 408*a*, 408*b* provides network capabilities to a plurality of client devices within the beams 408*a*, 408*b*. The communications network 400 is configured to implement spatial re-use of time-frequency elements, as illustrated in FIG. 5. This means that the same time slot and frequency subcarrier can be re-used for client devices that are geographically separated (e.g., covered by non-overlapping beams 408*a*, 408*b*). The antennas 405 are subject to power constraints in individual time slots, so power is shared across subcarriers and beams 408*a*, 408*b*. Where the antennas 405 are implemented on a satellite, for example, the beams 408*a*, 408*b* have a spatial element to them. Overlapping beams may result in interference between client devices if they use the same frequency subcarriers in the same time slots. This same interference constraint does not exist for client devices in non-overlapping beams. Thus, subcarriers may be re-used in non-overlapping beams 408*a*, 408*b*.

FIG. 5 illustrates an example of a division of transmission resources into time slots and frequency subcarriers in a communications network that provides a plurality of beams 408*a*, 408*b*, such as the communications network 400 of FIG. 4. Similar to the division of transmission resources described herein with reference to FIG. 2, transmission resources are divided into time frequency blocks 504 in the different beams 408*a*, 408*b*. There is spatial re-use of time-frequency elements because the same subcarriers used in beam A 408*a* can be used in beam B 408*b* in the same time slots. The communications network 400 can be configured to simultaneously illuminate client devices in beams A and B so that power is shared across beams as well as across subcarriers. The result is that transmission power is allocated across the plurality of beams simultaneously.

Figure 6:
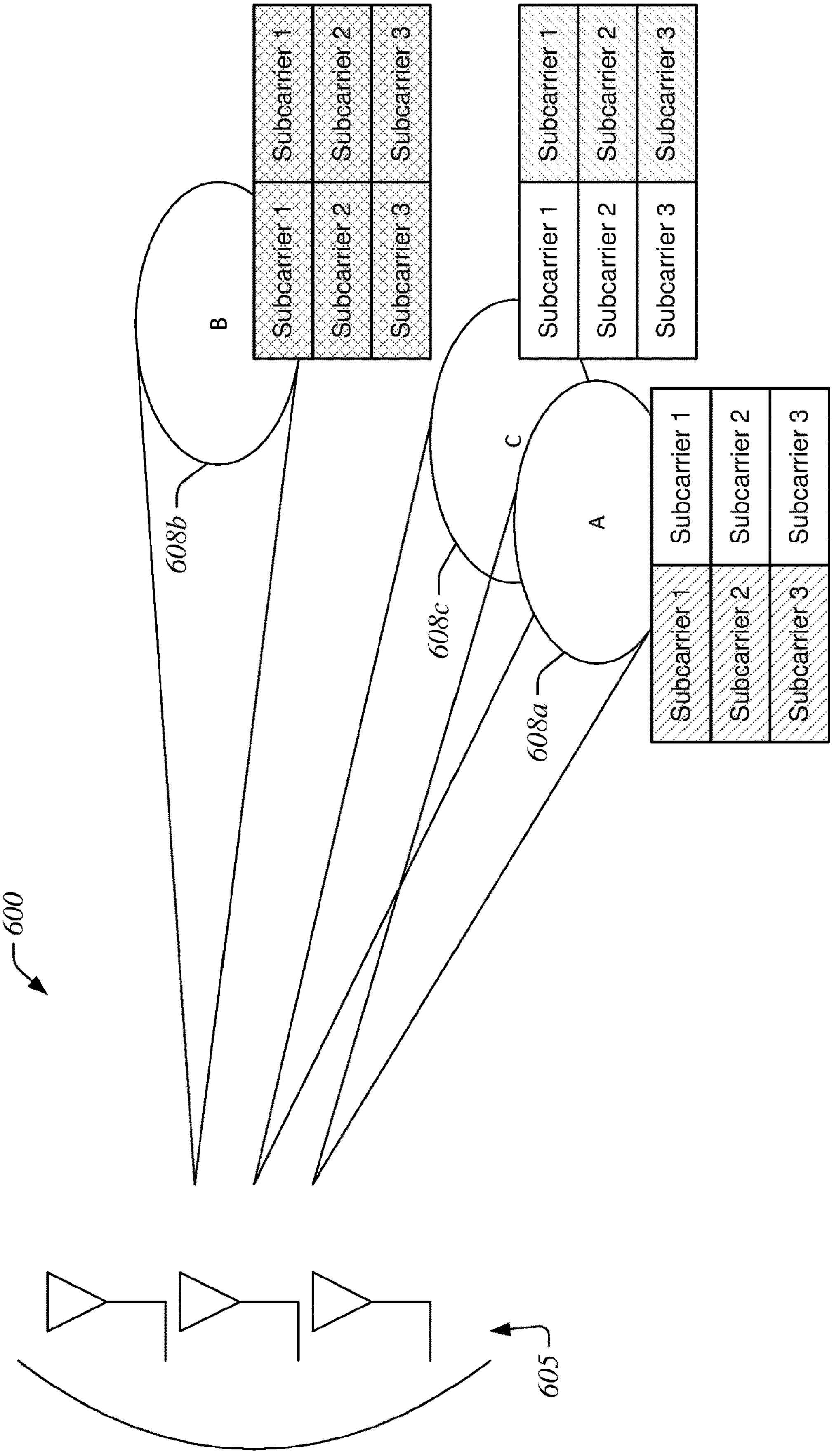
FIG. 6 illustrates another example communications network with beamforming wherein beams potentially interfere with one another.

FIG. 6 illustrates another example communications network 600 with beamforming wherein beams potentially interfere with one another. The communications network 600 is similar to the communications network 400 of FIG. 4 except that the communications network 600 forms beam A 608*a*, beam B 608*b*, and beam C 608*c* with beam A 608*a* and beam C 608*c* at least partially overlapping (e.g., beam A 608*a* and beam C 608*c* cover overlapping geographical areas). The communications network 600 includes antennas 605 that from the beams 608*a*-608*c*.

Beam B 608*b* can utilize the same transmission resources as beam A 608*a* and beam C 608*c* without experiencing interference. However, the overlapping beams 608*a*, 608*c* use separate (e.g., orthogonal) transmission resources to avoid potential interference. For example, client devices in beams A and C may experience interference if the same frequency subcarriers were used for these client devices during the same time slot.

In some embodiments, client devices in beam A 608*a* are assigned time frequency blocks in a different time slot from the client devices in beam C 608*c* to avoid interference. For example, a first time slot can be assigned to client devices in beam A 608*a* and a second time slot can be assigned to client devices in beam C 608*c*. As another example, a first plurality of contiguous time slots can be assigned to client devices in beam A 608*a* and a second plurality of contiguous time slots can be assigned to client devices in beam C 608*c*. In certain embodiments, subcarriers can be assigned to client devices in beam A 608*a* that are different from subcarriers assigned to client devices in beam C 608*c*. In various embodiments, a combination of time slots and frequency subcarriers can be assigned to client devices in beam A 608*a* that are different from a combination of time slots and frequency subcarriers assigned to client devices in beam C 608*c*.

In the communications network 600, power constraints exist for the collection of beams A, B, C 608*a*-608*c* rather than for individual beams. Power is shared for a given time slot across all of the beams 608*a*-608*c*. Accordingly, the disclosed power allocation technologies determine fairness for client devices across the plurality of beams 608*a*-608*c*. Allocating transmission power in these types of scenarios may be complicated because client devices in beam A 608*a* and beam C 608*c* divide transmission resources whereas any of the transmission resources can be allocated to client devices in beam B 608*b*. For example, client devices in beam A 608*a* can be allocated transmission power in a first time slot, client devices in beam C 608*c* can be allocated transmission power in a second time slot, and client devices in beam B 608*b* can be allocated transmission power in both the first and second time slots. Thus, in allocating transmission power a client device in beam B 608*b* can be allocated transmission power in either time slot to satisfy fairness considerations. Thus, the disclosed transmission power allocation technologies can be configured to achieve fairness across multiple time slots (e.g., fairness can be determined for a subset of time slots in a frame, for all time slots in a frame, or for multiple frames). In this way, the disclosed power allocation technologies are configured to respect power constraints for individual time slots while being able to allocate transmission power across a plurality of time slots. Furthermore, fairness can be achieved by considering multiple time slots rather than achieving fairness for each time slot.

The disclosed power allocation technologies are configured to fairly allocate power among the various subcarriers and beams 608*a*-608*c*. The power allocation technologies can be configured to ensure or achieve fairness over a number of time slots rather than for each individual time slot. Thus, the power allocation technologies allocate power over a number of slots, n, and a power allocation solution is computed for every n time slots. This is repeated for each n time slots. By way of example, a frame can include 10 time slots, 64 time slots, or other numbers of time slots. In addition, once a power allocation solution is determined, that same solution can be used for a period of time, T. The period of time, T, can be about 1 second, about 2 seconds, at least 1 second and/or less than or equal to 2 seconds, greater than or equal to 2 seconds, or less than or equal to 1 second.

Figure 7:
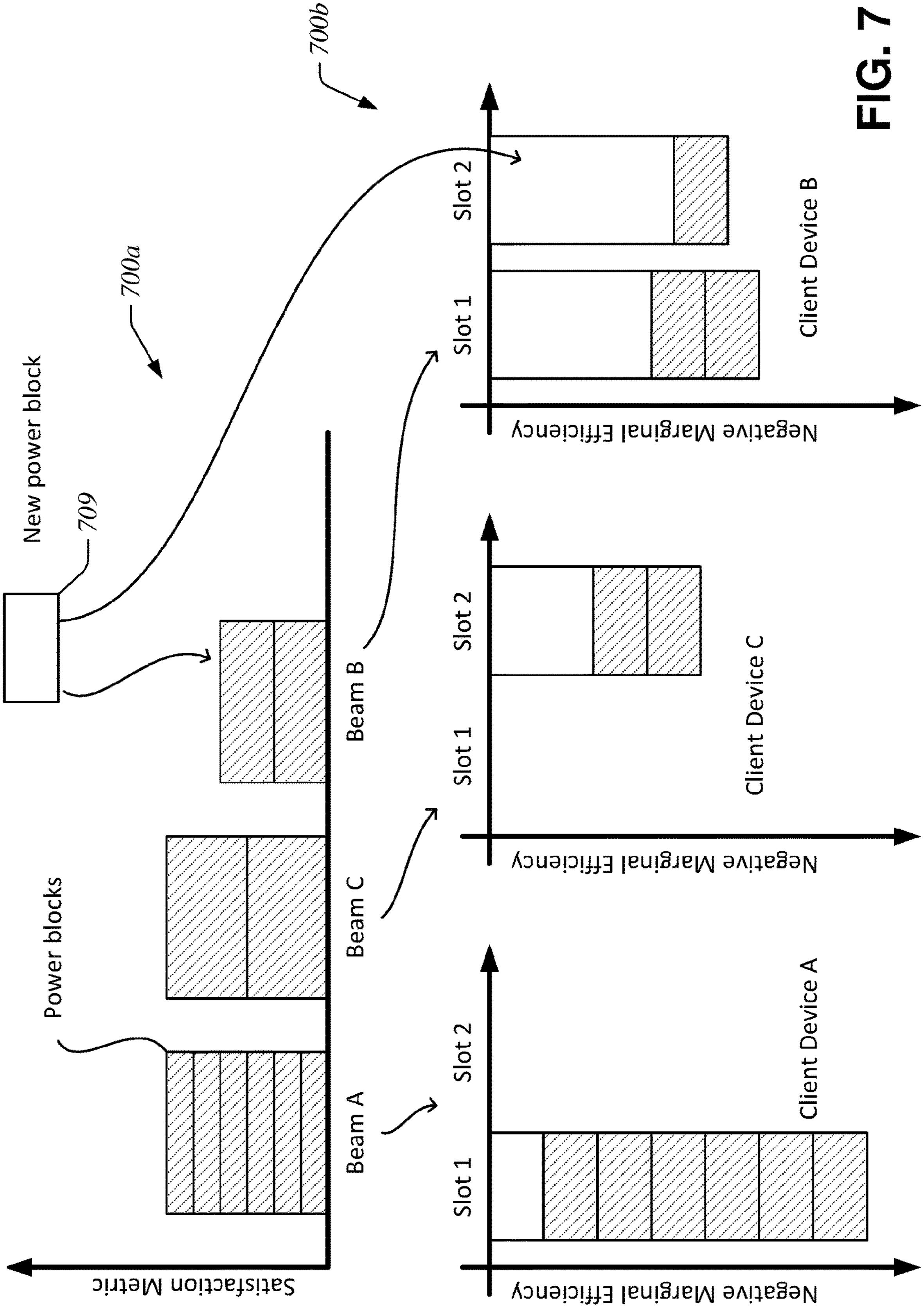
FIG. 7 illustrates the allocation of transmission resources to a plurality of client devices on different beams based on a satisfaction metric.

FIG. 7 illustrates the allocation of transmission resources to a plurality of client devices on different beams based on a satisfaction metric. The different beams are provided in the communications network 600 described herein with respect to FIG. 6. Thus, beams A and B are spatially separate whereas beams A and C at least partially overlap. In the top graph 700*a*, the satisfaction metric is measured along the y-axis. In the bottom graphs 700*b*, the negative marginal efficiency is plotted along the y-axis and time is plotted along the x-axis.

A new power block 709 (ΔP) is ready to be allocated. Because client device B is the least satisfied (e.g., it has the smallest satisfaction metric), client device B is selected to receive the new power block 709. Client device A and client device C are equally satisfied even though they have not been allocated the same amount of transmission power (as illustrated by the number of blocks). Because client device B is spatially separate from beams A and C, power can be allocated in time slot 1 or time slot 2. In contrast, power can be allocated to client device A on beam A in time slot 1 but not time slot 2 and power can be allocated to client device C on beam C in time slot 2 but not time slot 1. This follows the example illustrated in FIG. 6 but it should be understood that other ways to provide orthogonal resources to the overlapping beams can be used, as described herein. The new power block 709 is assigned to time slot 2 because it has a higher marginal efficiency than time slot 1.

Accordingly, the satisfaction metric can be used to determine which client device is to receive the next allocation of transmission power while the marginal benefit (or negative marginal efficiency) can be used to determine to which of the client's time slots to allocate the block of transmission power. This portion of the process can be similar to classical waterfilling algorithms where total capacity or throughput is used to determine to which time slot an allocation of transmission power should be made. In such embodiments, the disclosed power allocation technologies can act as a nested loop where an outer loop selects a client device based on fairness considerations (e.g., a satisfaction metric) and an inner loop allocates power based on marginal benefit.

Transmission Power Allocation Methods

Figure 8:
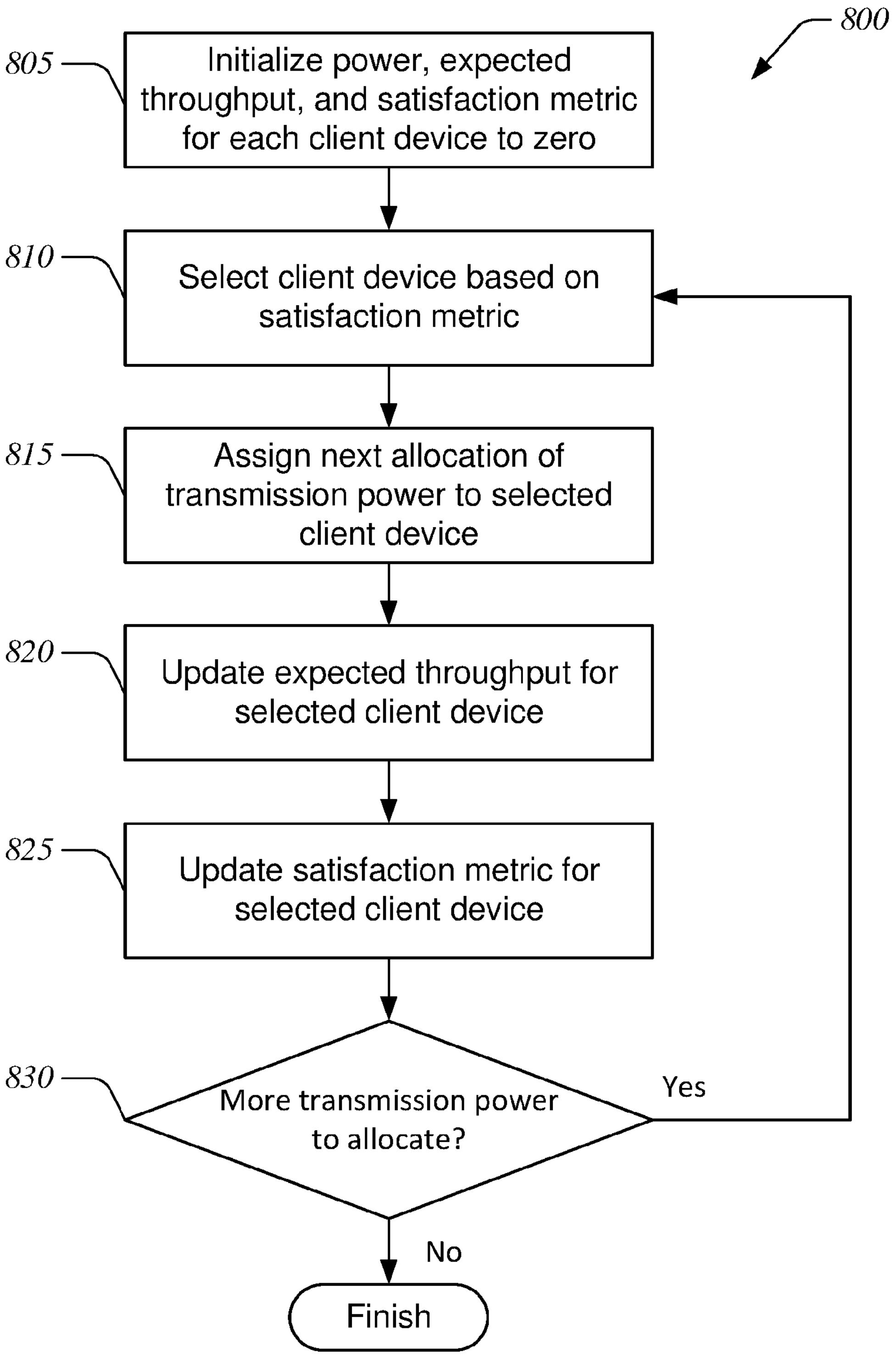
FIG. 8 illustrates a flow chart of an example method for allocating transmission resources among a plurality of client devices in a communications network.

FIG. 8 illustrates a flow chart of an example method 800 for allocating transmission resources among a plurality of client devices in a communications network. For ease of description, the method 800 is described as being performed by a power allocation system, similar to the power allocation system described herein with respect to FIG. 12. However, it is to be understood that the method 800 can be performed by any device, module, or system described herein or any combination of devices, modules, or systems described herein. Similarly, portions of the method 800 can be performed by a certain device, module, or system described herein and other portions of the method 800 can be performed by a different device, module, or system described herein.

The method 800 is configured to allocate transmission power to a plurality of client devices. Client devices can be assigned one or more time frequency blocks. The time frequency blocks assigned to a client device do not interfere with time frequency blocks assigned to other client devices. The time frequency blocks can share time slots but may or may not use the same frequency. The time frequency blocks in a time slot are subject to a total or aggregate power constraint. In other words, the total of allocated power is configured to be less than or equal to a total power constraint that is associated with the physical capacity of the transmitter. The method 800 is configured to allocate power to time frequency blocks such that throughputs for client devices are fair according to one or more quality-of-service (QOS) parameters.

In block 805, the power allocation system initializes a power, expected throughput, and satisfaction metric for each client device to an initial value, such as zero. During the method 800, the power allocation system is configured to determine and/or update the expected throughput for each client device of a plurality of client devices. Similarly, during the method 800, the power allocation system is configured to calculate and/or update a satisfaction metric for each client device.

To allocate transmission power or transmission resources, the power allocation system iteratively performs the steps in blocks 810-830. This portion of the method 800 can terminate once all of the available transmission power has been allocated or if each client device achieves a maximum transmission rate (or permitted capacity).

In block 810, the power allocation system selects a client device from the plurality of client devices, the selection based on the calculated satisfaction metric. In instances where multiple client devices have the same satisfaction metric, a client device may be chosen at random. The selected device has a satisfaction metric that indicates that it is the least satisfied client device. In some embodiments, the selected device has the lowest satisfaction metric.

In block 815, the power allocation system assigns the next allocation of transmission power to the selected client device. In block 820, the power allocation system updates the expected throughput of the selected client device based on the aggregate transmission power allocated to the selected client device. In some embodiments, transmission power is allocated on a plurality of different time frequency blocks for a particular client device. In such embodiments, the expected throughput is the total expected throughput considering the allocated transmission power on all of the time frequency blocks assigned to the selected client device. In some embodiments, a client device is assigned to a single time frequency block rather than being assigned to a plurality of time frequency blocks.

The expected throughput can be determined based on a number of factors such as properties of the client device, a signal-to-noise ratio (SNR), channel quality, and the like. In some embodiments, the channel quality (Q) can be SNR divided by power (P), or a SNR per unit of power. In some embodiments, the expected throughput (ET) can be the bandwidth of a channel (BW) times log (1+P*Q) (e.g., from Shannon theory). In some embodiments, ET can be BW*Fun (P*Q) and can be found in a transmitter lookup table as a function of modulation/coding order.

In block 825, the power allocation system updates the satisfaction metric for the selected client device. The updated satisfaction metric is based at least in part on the updated expected throughput determined in block 820. The satisfaction metric can be based at least in part on QoS parameters. Each client device can be assigned QoS parameters such as, for example and without limitation, a committed capacity or minimum transmission rate, a permitted capacity or maximum transmission rate, a weight, a priority, and the like. The satisfaction metric can be based at least in part on the expected throughput determined during the method 800.

In block 830, the power allocation system determines whether there is additional transmission power available for allocation. If there is available transmission power, the power allocation system returns to block 810 to select a client device to allocate transmission power. If there is no more available transmission power available, the power allocation system terminates the method 800. In some embodiments, the power allocation system terminates the method 800 if the expected throughput of each client device exceeds a maximum transmission rate (or permitted capacity) associated with the client device.

Figure 9:
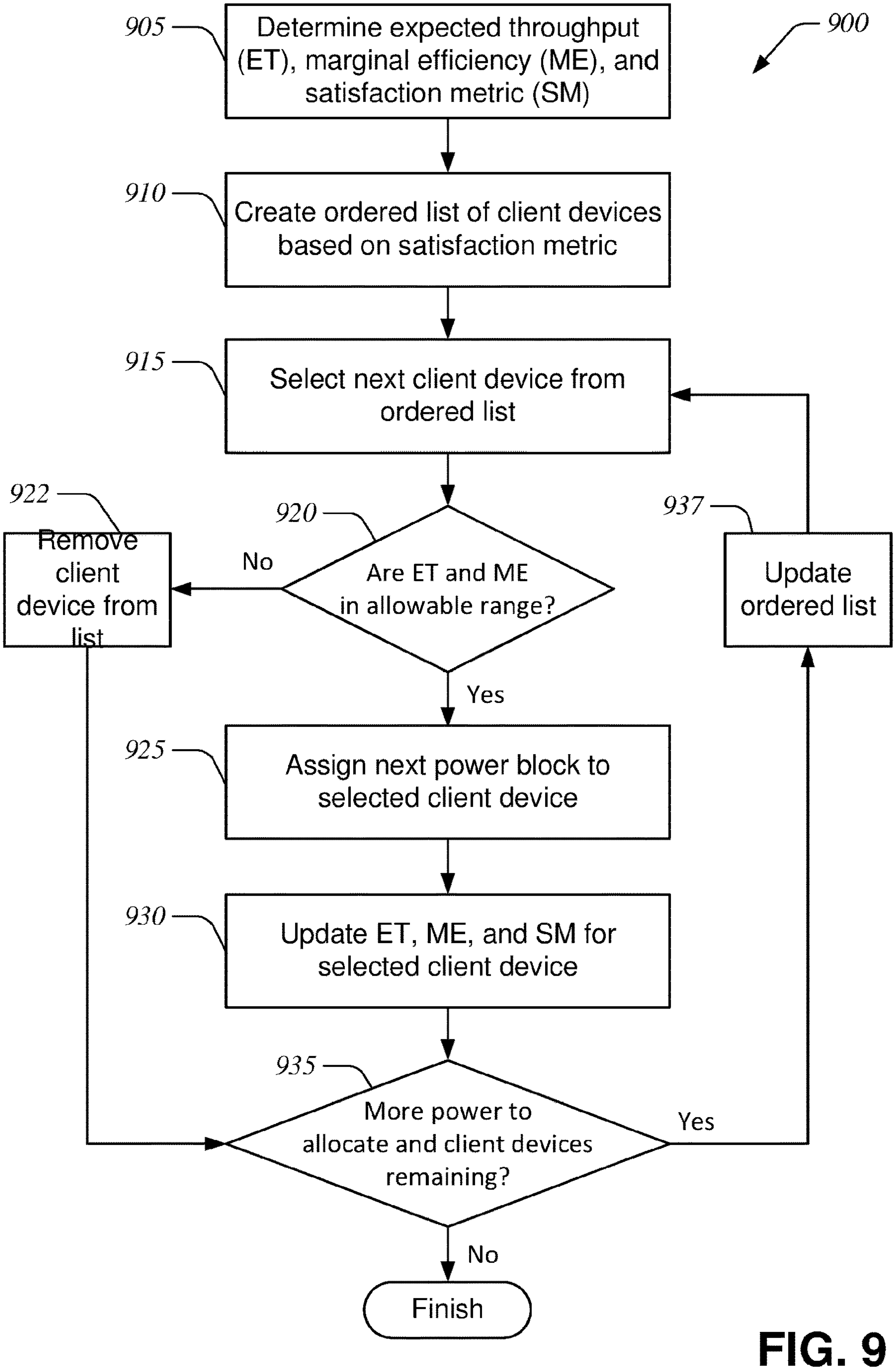
FIG. 9 illustrates a flow chart of another example method for allocating transmission resources among a plurality of client devices in a communications network.

FIG. 9 illustrates a flow chart of another example method 900 for allocating transmission resources among a plurality of client devices in a communications network. The method 900 is similar to the method 800 with certain differences related to considering marginal efficiencies for client devices. For ease of description, the method 900 is described as being performed by a power allocation system, similar to the power allocation system described herein with respect to FIG. 12. However, it is to be understood that the method 900 can be performed by any device, module, or system described herein or any combination of devices, modules, or systems described herein. Similarly, portions of the method 900 can be performed by a certain device, module, or system described herein and other portions of the method 900 can be performed by a different device, module, or system described herein.

The method 900 is configured to allocate transmission power to a plurality of client devices, like the method 800. The method 900 also considers marginal efficiency. This may be advantageous to avoid allocating transmission resources to bad or low-quality time frequency blocks. This represents a compromise to the fairness approach for allocating power described in the method 800.

In block 905, the power allocation system determines for each client device of a plurality of client devices an expected throughput, a marginal efficiency, and a satisfaction metric. The expected throughput can be determined as described herein with respect to the method 800 of FIG. 8. Similarly, the satisfaction metric can be determined as described herein with respect to the method 800 of FIG. 8. In some embodiments, the marginal efficiency (ME) can be the marginal capacity (MC) divided by the bandwidth (BW) of the client device, where the marginal capacity (MC) is the derivative with respect to power of the expected throughput (ET) of the client device. In block 910, the power allocation system creates an ordered list of the client devices, the order being based on the values of the satisfaction metric.

To allocate transmission power or transmission resources, the power allocation system iteratively performs the steps in blocks 915-935. This portion of the method 900 can terminate once all of the available transmission power has been allocated, if each client device achieves a maximum transmission rate (or permitted capacity), or if each client device exceeds an associated marginal efficiency threshold.

In block 915, the power allocation system selects a client device from the ordered list of client devices. The selected client device has a satisfaction metric that indicates that it is the least satisfied client device. In some embodiments, the selected device is the first client device on the ordered list of client devices created in block 910.

In block 920, the power allocation system determines whether the expected throughput (ET) and marginal efficiency (ME) are within allowable ranges. In some embodiments, if the ET exceeds a permitted capacity or maximum transmission rate, then the ET is outside of the allowable range and the power allocation system removes the client device from the ordered list in block 922.

Each client device can have one or more marginal efficiency thresholds associated therewith. In some embodiments, a first marginal efficiency threshold can be a permitted capacity marginal efficiency threshold (MET_PC) and a second marginal efficiency threshold can be a committed capacity marginal efficiency threshold (MET_CC). If the marginal efficiency of a client device is higher than MET_PC and the ET of the client device is less than a permitted capacity (PC) then the client device can receive more power. If the marginal efficiency of a client device is higher than MET_CC and the ET of the client device is less than a committed capacity (CC) then the client device can receive more power. If any of these thresholds are violated, then the client device is removed from the ordered list in block 922. A purpose of checking that the marginal efficiency is within an allowable range is to verify that the selected client device is not experiencing undesirable diminishing returns. In other words, the power allocation system is configured to determine whether there is sufficient efficiency in converting allocated transmission power to throughput for the selected client device.

Responsive to determining that the expected throughput and marginal efficiency are within allowable ranges, the power allocation system allocates the next power block to the selected client device in block 925. In block 930, the power allocation system updates the expected throughput, marginal efficiency, and satisfaction metric for the selected client device. The power allocation system updates the expected throughput of the selected client device based on the aggregate transmission power allocated to the selected client device. The updated satisfaction metric is based at least in part on the updated expected throughput. Similarly, the updated marginal efficiency is based at least in part on the updated expected throughput. In some embodiments, the power allocation system is configured to increase the marginal efficiency value for the selected device.

In block 935, the power allocation system determines whether there is additional transmission power available for allocation and if there are any client devices remaining on the ordered list. If there is available transmission power and client devices on the ordered list, the power allocation system updates the ordered list based on the updated satisfaction metric in block 937 and returns to block 915 to select a client device to allocate transmission power. If there is no more available transmission power available or if there are no more client devices remaining on the list, the power allocation system terminates the method 900. In some embodiments, the power allocation system terminates the method 900 if the expected throughput of each client device exceeds a maximum transmission rate (or permitted capacity) associated with the client device.

Figure 10:
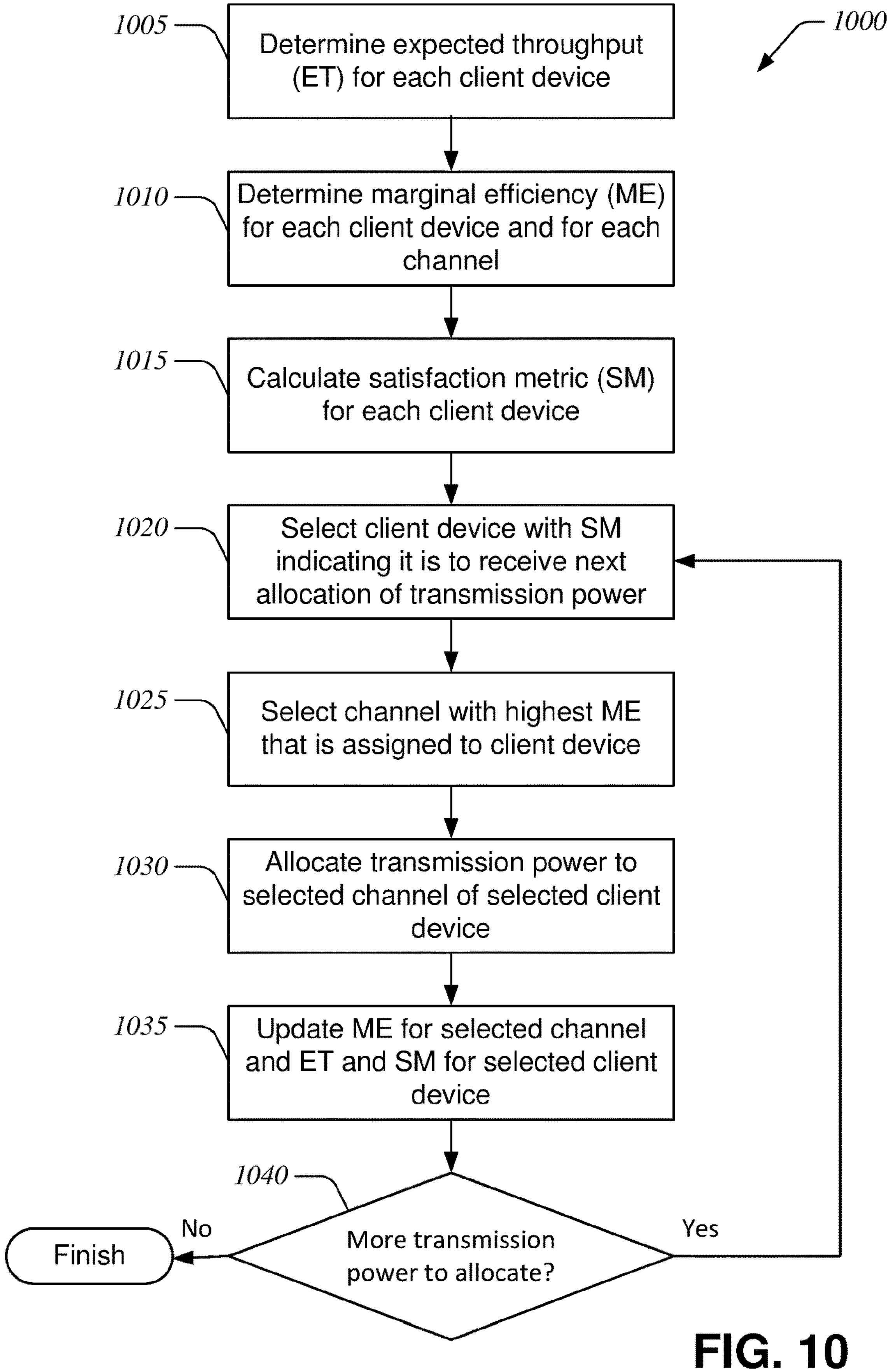
FIG. 10 illustrates a flow chart of another example method for allocating transmission resources among a plurality of client devices in a communications network.

FIG. 10 illustrates a flow chart of another example method 1000 for allocating transmission resources among a plurality of client devices in a communications network. The method 1000 is similar to the method 800 with certain differences related to allocating transmission power in a communications network that may experience interference between time frequency blocks. This may occur in a communications network that provides a plurality of beams, such as the communications network 400 or 600 described herein with reference to FIGS. 4 and 6, respectively. For ease of description, the method 1000 is described as being performed by a power allocation system, similar to the power allocation system described herein with respect to FIG. 12. However, it is to be understood that the method 1000 can be performed by any device, module, or system described herein or any combination of devices, modules, or systems described herein. Similarly, portions of the method 1000 can be performed by a certain device, module, or system described herein and other portions of the method 1000 can be performed by a different device, module, or system described herein.

The method 1000 is configured to allocate transmission power to a plurality of client devices, like the method 800. The method 1000 also considers marginal efficiency. Marginal efficiency is considered after the selection of a client device based on a satisfaction metric, the marginal efficiency being used to determine which time frequency block to allocate transmission power. The method 1000 finds particular utility in situations where a plurality of different time frequency blocks in different time slots can be used for transmitting information to a client device. In such situations, after selecting a least satisfied client device, the marginal efficiency can be used to select a time frequency block for an efficient allocation of power.

In some embodiments, the method 1000 initiates by determining a time frequency block quality per client device per time frequency block. Initiation of the method 1000 may also include initializing allocated powers to the time frequency blocks to be zero or some other default value.

In block 1005, the power allocation system determines an expected throughput for each client device. The expected throughput is calculated as described herein and can account for selected devices with multiple time frequency blocks assigned to them. In some embodiments, each client device has one or more time frequency blocks and the time frequency blocks do not interfere with each other. The expected throughput is the sum of the throughputs of each time frequency block of the client device.

In block 1010, the power allocation system determines marginal efficiency (ME) for each client device and for each time frequency block. The marginal efficiency can be calculated as described herein. A client device can have one or more time frequency blocks available to it, which may be particularly useful where interference between time frequency blocks may be a problem. To evaluate the effectiveness of allocating power to a time frequency block for a selected client device, the marginal efficiency is determined for each time frequency block for each client device.

In block 1015, the power allocation system calculates a satisfaction metric for each client device. The satisfaction metric can be calculated as described herein.

To allocate transmission power or transmission resources, the power allocation system iteratively performs the steps in blocks 1020-1040. This portion of the method 1000 can terminate once all of the available transmission power has been allocated or if each client device achieves a maximum transmission rate (or permitted capacity).

In block 1020, the power allocation system selects a client device based on the satisfaction metric, the satisfaction metric indicating that the selected client device is the least satisfied client device. In some embodiments, the selected device has the lowest satisfaction metric.

In block 1025, the power allocation system selects the time frequency block available to the selected client device, the selected time frequency block having the highest marginal efficiency. The time frequency blocks available for selection may be spread across a plurality of time slots, each time slot having an associated power constraint.

This step is similar to typical waterfilling algorithms, but it is performed after selecting a client device based at least in part on fairness considerations. By combining fairness with typical waterfilling algorithms, the method 1000 is configured to ensure fairness and to increase, maximize, or optimize total throughput across all client devices.

In block 1030, the power allocation system allocates a next block of transmission power to the selected client device on the selected time frequency block. In block 1035, the power allocation system updates the marginal efficiency for the selected time frequency block and updates the expected throughput and satisfaction metric of the selected client device.

In block 1040, the power allocation system determines whether there is additional transmission power available for allocation. In some embodiments, the available transmission power is determined for each time slot available for power allocation. In such embodiments, transmission power is available if a time slot has not exceeded its power constraint. If there is available transmission power, the power allocation system returns to block 1020 to select a client device to allocate transmission power. If there is no more available transmission power available, the power allocation system terminates the method 1000. In some embodiments, the power allocation system terminates the method 1000 if the expected throughput of each client device exceeds a maximum transmission rate (or permitted capacity) associated with the client device.

Figure 11:
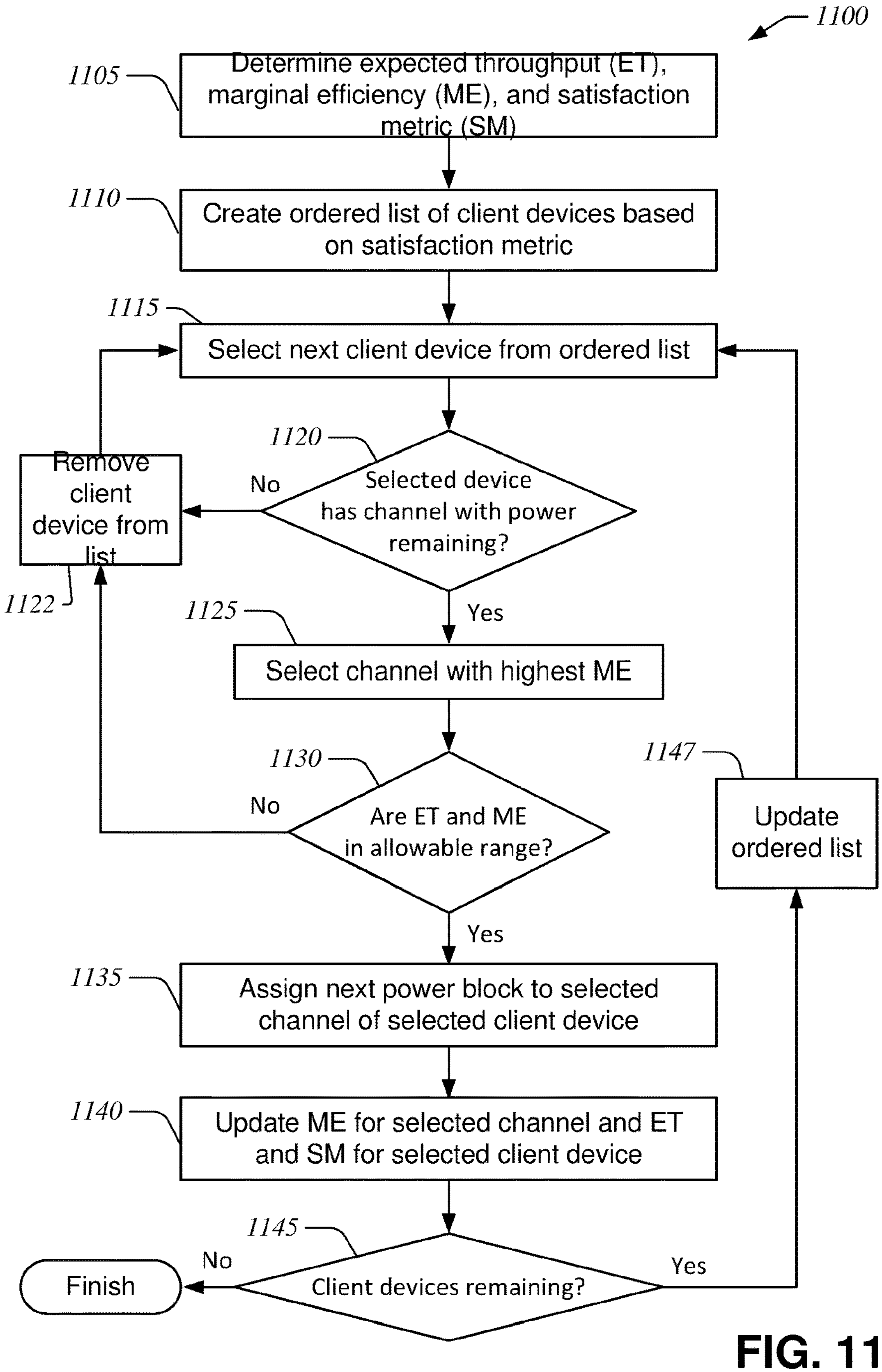
FIG. 11 illustrates a flow chart of another example method for allocating transmission resources among a plurality of client devices in a communications network.

FIG. 11 illustrates a flow chart of another example method for allocating transmission resources among a plurality of client devices in a communications network. The method 1100 is similar to the method 900 with certain differences related to allocating transmission power in a communications network that may experience interference between time frequency blocks. This may occur in a communications network that provides a plurality of beams, such as the communications network 400 or 600 described herein with reference to FIGS. 4 and 6, respectively. For ease of description, the method 1100 is described as being performed by a power allocation system, similar to the power allocation system described herein with respect to FIG. 12. However, it is to be understood that the method 1100 can be performed by any device, module, or system described herein or any combination of devices, modules, or systems described herein. Similarly, portions of the method 1100 can be performed by a certain device, module, or system described herein and other portions of the method 1100 can be performed by a different device, module, or system described herein.

The method 1100 is configured to allocate transmission power to a plurality of client devices, like the method 900. The method 1100 considers marginal efficiency in the selection of a time frequency block assigned to a client device after the selection of a client device based on a satisfaction metric. The marginal efficiency is used to determine to which time frequency block to allocate transmission power. The method 1100 finds particular utility in situations where a plurality of different time frequency blocks in different time slots can be used for transmitting information to a client device. In such situations, after selecting a least satisfied client device, the marginal efficiency can be used to select a time frequency block for an efficient allocation of power.

In some embodiments, the method 1100 initiates by determining a time frequency block quality per client device per time frequency block. Initiation of the method 1100 may also include initializing allocated powers to the time frequency blocks to be zero or some other default value.

In block 1105, the power allocation system determines for each client device an expected throughput and a satisfaction metric and for each time frequency block a marginal efficiency. The expected throughput can be determined as described herein. Similarly, the satisfaction metric can be determined as described herein. Likewise, the marginal efficiency (ME) can be determined as described herein. In block 1110, the power allocation system creates an ordered list of the client devices, the order being based on the values of the satisfaction metric.

To allocate transmission power or transmission resources, the power allocation system iteratively performs the steps in blocks 1115-1145. This portion of the method 1100 can terminate once all of the available transmission power has been allocated, if each client device achieves a maximum transmission rate (or permitted capacity), or if there are no more client devices remaining on the ordered list created in block 1110.

In block 1115, the power allocation system selects a client device from the ordered list of client devices. The selected client device has a satisfaction metric that indicates that it is the least satisfied client device. In some embodiments, the selected device is the first client device on the ordered list of client devices created in block 1110.

In block 1120, the power allocation system determines whether the selected client device has a time frequency block with power available to be allocated. If not, the client device is removed from the ordered list in block 1122 and the method returns to block 1115. If there are time frequency blocks available, the power allocation system selects the time frequency block with the highest marginal efficiency in block 1125.

In block 1130, the power allocation system determines whether the expected throughput (ET) of the selected device and the marginal efficiency (ME) of the selected time frequency block are within allowable ranges. In some embodiments, if the ET exceeds a permitted capacity or maximum transmission rate, then the ET is outside of the allowable range and the power allocation system removes the client device from the ordered list in block 1122.

As described herein, a marginal efficiency threshold can be used to ensure that power is being allocated to a time frequency block that is not experiencing excessive diminishing returns. In other words, a marginal efficiency threshold can be used to ensure efficient allocation of transmission power. Each client device can have one or more marginal efficiency thresholds associated therewith. In some embodiments, a first marginal efficiency threshold can be a permitted capacity marginal efficiency threshold (MET_PC) and a second marginal efficiency threshold can be a committed capacity marginal efficiency threshold (MET_CC). If the marginal efficiency of a client device is higher than MET_PC and the ET of the client device is less than a permitted capacity (PC) then the client device can receive more power. If the marginal efficiency of a client device is higher than MET_CC and the ET of the client device is less than a committed capacity (CC) then the client device can receive more power. If any of these thresholds are violated, then the client device is removed from the ordered list in block 1122.

Responsive to determining that the expected throughput and marginal efficiency are within allowable ranges, the power allocation system allocates the next power block to the selected client device in block 1135. In block 1140, the power allocation system updates the marginal efficiency for the selected time frequency block and the expected throughput and satisfaction metric for the selected client device. The power allocation system updates the expected throughput of the selected client device based on the aggregate transmission power allocated to the selected client device across the plurality of time frequency blocks assigned to the selected client device. The updated satisfaction metric is based at least in part on the updated expected throughput. Similarly, the updated marginal efficiency is based at least in part on the updated expected throughput. In some embodiments, the power allocation system is configured to decrease the marginal efficiency value for the selected device.

In block 1145, the power allocation system determines whether there is additional transmission power available for allocation and if there are any client devices remaining on the ordered list. If there is available transmission power and client devices on the ordered list, the power allocation system updates the ordered list based on the updated satisfaction metric in block 1147 and returns to block 1115 to select a client device to allocate transmission power. If there is no more available transmission power available or if there are no more client devices remaining on the list, the power allocation system terminates the method 1100. In some embodiments, the power allocation system terminates the method 1100 if the expected throughput of each client device exceeds a maximum transmission rate (or permitted capacity) associated with the client device.

Transmission Power Allocation Systems

Figure 12:
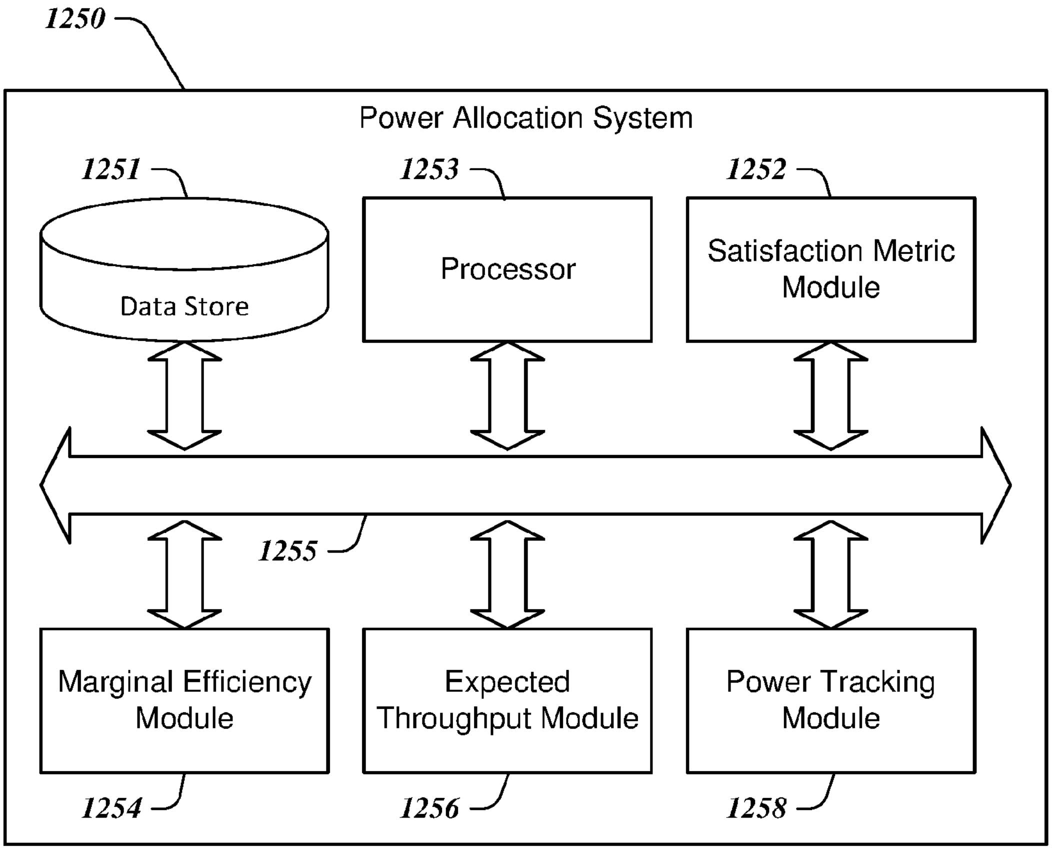
FIG. 12 illustrates a block diagram of an example power allocation system in a communications network.

FIG. 12 illustrates a block diagram of an example power allocation system 1250 in a communications network, such as the communications networks described herein with reference to FIGS. 1A, 1B, 4, and 6. The power allocation system 1250 is configured to allocate transmission power to client devices on the communications network. The power allocation system 1250 is similar to the power allocation module 150 described herein with reference to FIG. 1A and can be implemented in the communications network there described. The power allocation system 1250 can employ any method described herein for the allocation of transmission power in a communications network, such as the example methods 800, 900, 1000, 1100 described herein with reference to FIGS. 8-11, respectively.

The power allocation system 1250 can include hardware, software, and/or firmware components for allocating transmission power to client devices based on fairness considerations. The power allocation system 1250 includes a data store 1251, one or more processors 1253, a satisfaction metric module 1252, a marginal efficiency module 1254, an expected throughput module 1256, and a power tracking module 1258. Components of the power allocation system 1250 can communicate with one another, with external systems, and with other components of a network, such as a transmitter, using communication bus 1255. The power allocation system 1250 can be implemented using one or more computing devices. For example, the power allocation system 1250 can be implemented using a single computing device, multiple computing devices, a distributed computing environment, or it can be located in a virtual device residing in a public or private computing cloud. In a distributed computing environment, one or more computing devices can be configured to provide the modules described herein to provide the described functionality.

The power allocation system 1250 includes the satisfaction metric module 1252. The satisfaction metric module 1252 is configured to determine a satisfaction metric as described herein. The satisfaction metric can be an indicator of the satisfaction or fairness of power allocation based on quality-of-service parameters such as priority, weight, maximum transmission rate, permitted capacity, minimum transmission rate, committed capacity, and the like. The satisfaction metric can be responsive to changes in the amount of transmission power allocated to a client device.

The power allocation system 1250 includes the marginal efficiency module 1254. The marginal efficiency module 1254 is configured to determine the marginal efficiency of each time frequency block. The marginal efficiency can be used in conjunction with the satisfaction metric to fairly and efficiently allocate transmission power to client devices. The marginal efficiency can also be used to determine which time frequency block to allocate transmission power after selecting a client device based on the satisfaction metric. The marginal efficiency can be calculated or determined using any suitable algorithm, calculation, or method.

The power allocation system 1250 includes the expected throughput module 1256. The expected throughput module 1256 is configured to determine the expected throughput for a client device based on the total power allocated to the client device which may including summing the expected throughputs of each time frequency block assigned to the client device. The expected throughput can be based on time frequency block quality, SNR, allocated power, and the like. The expected throughput can be determined as described herein.

The power allocation system 1250 includes the power tracking module 1258. The power tracking module 1258 is configured to ensure that power constraints are respected when allocation transmission power to client devices. The power tracking module 1258 is further configured to determine if there is power available to allocate. The power tracking module 1258 is further configured to determine or set a size of a block of power for allocation.

The power allocation system 1250 includes one or more processors 1253 that are configured to control operation of the modules 1252, 1254, 1256, 1258 and the data store 1251. The one or more processors 1253 implement and utilize the software modules, hardware components, and/or firmware elements configured to allocate transmission power to a plurality of client devices on a communications network. The one or more processors 1253 can include any suitable computer processors, application-specific integrated circuits (ASICs), field programmable gate array (FPGAs), or other suitable microprocessors. The one or more processors 1253 can include other computing components configured to interface with the various modules and data stores of the power allocation system 1250.

The power allocation system 1250 includes the data store 1251 configured to store configuration data, calibration data, channel quality data, power data, device data, databases, data tables, algorithms, executable instructions (e.g., instructions for the one or more processors 1253), and the like. The data store 1253 can be a non-transitory computer-readable medium that stores processor-executable instructions, or instructions that are configured to cause the one or more processors 1253 to perform one or more functions (such as the functions performed by the modules 1252, 1254, 1256, 1258 and/or the methods described herein with reference to FIGS. 8-11). The data store 1251 can be any suitable data storage device or combination of devices that include, for example and without limitation, random access memory, read-only memory, solid-state disks, hard drives, flash drives, bubble memory, and the like.

Additional Embodiments

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A power allocation system for a communications network, the power allocation system comprising:

a transmitter configured to transmit information to a plurality of client devices through a plurality of client satellite transceivers, the transmitter configured to transmit information using frames that are each divided into a plurality of time slots with each time slot including a plurality of frequency subcarriers;

a non-transitory computer-readable medium storing processor-executable instructions; and a processor communicatively coupled to the transmitter and the non-transitory computer-readable medium, the processor-executable instructions configured to cause the processor to:

assign a respective plurality of time frequency blocks to each client device of a plurality of client devices, each time frequency block comprising a time slot of the plurality of time slots and a frequency subcarrier of the plurality of frequency subcarriers;

determine a corresponding marginal efficiency for each time frequency block of the respective plurality of time frequency blocks assigned to each of the plurality of client devices;

determine an expected throughput for each of the plurality of client devices, the expected throughput based at least in part on an allocation of transmission power to an individual client device and a time frequency block quality for each of the respective plurality of time frequency blocks assigned to the individual client device;

for each client device of the plurality of client devices, calculate a satisfaction metric that is based at least in part on one or more quality of service parameters and the expected throughput for the client device; and iteratively allocate transmission power for a given time slot by:

selecting a client device with a satisfaction metric that indicates that the client device is next to be assigned an allocation of transmission power;

selecting a time frequency block that is assigned to the selected client device, the selected time frequency block having the highest marginal efficiency of the plurality of time frequency blocks assigned to the selected client device;

assigning the next allocation of transmission power to the selected time frequency block of the selected client device resulting in an aggregated amount of transmission power for the selected time frequency block;

updating the expected throughput for the selected client device based at least in part on the aggregated amount of transmission power for the selected time frequency block;

updating the marginal efficiency for the selected time frequency block; and updating the satisfaction metric for the selected client device.

2. The power allocation system of claim 1, wherein the transmitter comprises a satellite.

3. The power allocation system of claim 2, wherein the satellite is configured to form a plurality of beams.

4. The power allocation system of claim 3, wherein each time frequency block further includes a spatial component associated with individual beams of the plurality of beams.

5. The power allocation system of claim 1, wherein the time frequency block quality is based at least in part on an allocation of transmission power assigned to the time frequency block and a signal to noise ratio of the time frequency block.

6. The power allocation system of claim 1, wherein the processor is further configured to initialize transmission power allocated to each time frequency block to an initial power value prior to iteratively allocating the transmission power.

7. The power allocation system of claim 1, wherein the processor is further configured to determine an available amount of transmission power for the given time slot.

8. The power allocation system of claim 7, wherein the processor is further configured to reduce the available amount of transmission power for the given time slot based on the allocation of transmission power to the selected client device for the selected time frequency block.

9. The power allocation system of claim 1, wherein the processor is configured to assign the allocation of transmission power to the selected client device for the selected time frequency block responsive to determining that the selected time slot has sufficient transmission power available for the allocation of transmission power.

10. The power allocation system of claim 1, wherein the processor is configured to assign the selected client device the next allocation of transmission power responsive to determining that the marginal efficiency for the selected device is greater than a minimum marginal efficiency value.

11. The power allocation system of claim 10, wherein the processor is further configured to increase the minimum marginal efficiency value for the selected client device as part of iteratively allocating transmission power.

12. The power allocation system of claim 1, wherein the processor is further configured to order the plurality of client devices based on the satisfaction metric of each client device, an order of the plurality of client devices corresponding to a priority for allocating transmission power such that a first client device in the order is the client device to be assigned the next allocation of transmission power.

13. The power allocation system of claim 1, wherein the processor is further configured to assign the satisfaction metric of an individual client device to be a value that indicates that the individual client device is not to receive further allocations of transmission power responsive to the expected throughput of the individual client device being greater than or equal to a maximum transmission rate assigned to the individual client device.

14. The power allocation system of claim 1, wherein the one or more quality of service parameters includes a weight assigned to individual client devices of the plurality of client devices.

15. The power allocation system of claim 1, wherein the one or more quality of service parameters includes a maximum transmission rate assigned to individual client devices of the plurality of client devices.

16. The power allocation system of claim 1, wherein the one or more quality of service parameters includes a minimum transmission rate assigned to individual client devices of the plurality of client devices.

17. The power allocation system of claim 16, wherein the processor is further configured to assign the satisfaction metric of an individual client device to be the expected throughput divided by the minimum transmission rate responsive to the expected throughput being less than the minimum transmission rate.

18. The power allocation system of claim 17, wherein the processor is further configured to assign the satisfaction ratio of an individual client device to be one plus a difference between the expected throughput and the minimum transmission rate responsive to the expected throughput being greater than or equal to the minimum transmission rate and less than a maximum transmission rate assigned to the individual client device.

19. The power allocation system of claim 1, wherein the one or more quality of service parameters includes a priority assigned to individual client devices of the plurality of client devices.

20. The power allocation system of claim 19, wherein the processor is further configured to assign the satisfaction metric of an individual client device to be the priority plus a ratio of the expected throughput to a maximum transmission rate of the individual client device responsive to the expected throughput being less than the maximum transmission rate.

21. The power allocation system of claim 1, wherein the selected client device is the client device with the lowest satisfaction metric.

* * * * *